US012381300B2

(12) United States Patent
Kim et al.

(10) Patent No.: US 12,381,300 B2
(45) Date of Patent: Aug. 5, 2025

(54) TRANSMISSION LINE STRUCTURE HAVING A SIGNAL LINE SPACED APART FROM GROUND BY AN AIR LAYER AND THE SIGNAL LINE IS SUPPORTED AT A CENTER PART THEREOF

(71) Applicant: Samsung Electronics Co., Ltd., Suwon-si (KR)

(72) Inventors: Jonghwa Kim, Suwon-si (KR); Dongsik Shin, Suwon-si (KR); Jihye Kim, Suwon-si (KR); Haegweon Park, Suwon-si (KR); Seunghwan Yoon, Suwon-si (KR); Jongwook Zeong, Suwon-si (KR); Dabin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 18/182,054

(22) Filed: Mar. 10, 2023

(65) Prior Publication Data

US 2023/0208001 A1 Jun. 29, 2023

Related U.S. Application Data

(63) Continuation of application No. PCT/KR2021/020061, filed on Dec. 28, 2021.

(30) Foreign Application Priority Data

Dec. 30, 2020 (KR) ........................ 10-2020-0188294

(51) Int. Cl.
*H01P 3/08* (2006.01)

(52) U.S. Cl.
CPC .............. *H01P 3/084* (2013.01); *H01P 3/081* (2013.01); *H01P 3/087* (2013.01)

(58) Field of Classification Search
CPC ................................ H01P 3/087; H01P 3/084
(Continued)

(56) References Cited

U.S. PATENT DOCUMENTS 2,800,634 A 7/1957 Grieg et al.
5,105,055 A * 4/1992 Mooney et al. ....... H01R 12/62 361/776

(Continued)

FOREIGN PATENT DOCUMENTS

CN 106684515 A 5/2017
JP S62-164401 U 10/1987

(Continued)

OTHER PUBLICATIONS

European Search Report dated Mar. 18, 2024, issued in European Application No. 21915776.5.

(Continued)

*Primary Examiner* — Benny T Lee
(74) *Attorney, Agent, or Firm* — Jefferson IP Law, LLP

(57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). A transmission line structure of a wireless communication system is provided. The transmission line includes a ground area, a signal line, and a support. A first surface of the signal line is disposed to be spaced apart from the ground area via an air layer therebetween, a second surface of the signal line located opposite to the first surface may be coupled to the support, and the support may be coupled to the ground area.

20 Claims, 37 Drawing Sheets

(58) Field of Classification Search
USPC .......................................................... 333/238
See application file for complete search history.

(56) References Cited

U.S. PATENT DOCUMENTS

| | | | |
|---|---|---|---|
| 6,445,345 | B1 | 9/2002 | Kamimoto et al. |
| 6,714,104 | B1 | 3/2004 | Salmela |
| 6,888,427 | B2 | 5/2005 | Sinsheimer et al. |
| 7,812,451 | B2 | 10/2010 | Asano |
| 8,884,827 | B2 | 11/2014 | Satoh et al. |
| 9,391,370 | B2 | 7/2016 | Tzanidis et al. |
| 2002/0000936 | A1 | 1/2002 | Sheen |
| 2004/0000977 | A1 | 1/2004 | Killen et al. |
| 2005/0057326 | A1 | 3/2005 | Kuzmenka |
| 2008/0315977 | A1* | 12/2008 | Green et al. ........ H01P 1/20372 333/204 |
| 2014/0028413 | A1 | 1/2014 | Ishii et al. |
| 2019/0252243 | A1 | 8/2019 | Dow et al. |

FOREIGN PATENT DOCUMENTS

| | | | |
|---|---|---|---|
| JP | H5-218709 | A | 8/1993 |
| JP | 2012-119786 | A | 6/2012 |
| JP | 2002-542641 | A | 12/2022 |
| KR | 10-0327280 | B1 | 3/2002 |
| KR | 10-0632500 | B1 | 10/2006 |
| KR | 10-2017-0038690 | A | 4/2017 |
| KR | 10-2019-0138945 | A | 12/2019 |

OTHER PUBLICATIONS

Korean Office Action dated Dec. 27, 2024, issued in Korean Patent Application No. 10-2020-0188294.

* cited by examiner

TRANSMISSION LINE STRUCTURE HAVING A SIGNAL LINE SPACED APART FROM GROUND BY AN AIR LAYER AND THE SIGNAL LINE IS SUPPORTED AT A CENTER PART THEREOF

CROSS-REFERENCE TO RELATED APPLICATION(S)

This application is a continuation application, claiming priority under § 365 (c), of an International application No. PCT/KR2021/020061, filed on Dec. 28, 2021, which is based on and claims the benefit of a Korean patent application number 10-2020-0188294, filed on Dec. 30, 2020, in the Korean Intellectual Property Office, the disclosure of which is incorporated by reference herein in its entirety.

TECHNICAL FIELD

The disclosure relates to a wireless communication system. More particularly, the disclosure relates to a transmission line structure for reducing an insertion loss occurring in a transmission line of a wireless communication system, and an electronic device including the same.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (millimeter (mm) Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid frequency shift keying (FSK) and quadrature amplitude modulation (QAM) frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A transmission line structure used in a wireless communication system may be generally implemented as a printed circuit board (PCB). In this case, even in the PCB, a microstrip may be used in order to transmit a high-frequency radio frequency (RF) signal. The microstrip may include a metal layer used as a ground area, a metal signal line, and a dielectric layer existing between the ground area and the signal line. The insertion loss of a signal transmitted by the transmission line may be determined by the permittivity of the dielectric layer, the dielectric loss of the dielectric layer, and the intensity of an electric field generated around the signal line during signal transmission. In order to reduce the insertion loss, it is required to design a transmission line structure (e.g., a microstrip) as a more effective structure in consideration of the permittivity and dielectric loss of the dielectric layer and the intensity of the electric field generated in the transmission line during signal transmission.

The above information is presented as background information only to assist with an understanding of the disclosure. No determination has been made, and no assertion is made, as to whether any of the above might be applicable as prior art with regard to the disclosure.

SUMMARY OF THE INVENTION

Technical Problem

Aspects of the disclosure are to address at least the above-mentioned problems and/or disadvantages and to provide at least the advantages described below. Accordingly, an aspect of the disclosure is to provide a transmission line structure including an air layer (air gap) formed as a ground area layer and a signal line are spaced apart from each other using a support in a wireless communication system.

Another aspect of the disclosure is to provide a transmission line structure capable of lowering a production cost while reducing the insertion loss of the transmission line using a support in a wireless communication system.

Another aspect of the disclosure is to provide various transmission line structures for disposing a ground area layer and a signal line to be spaced apart from each other in a wireless communication system.

Another aspect of the disclosure is to provide a method and structure for disposing a support disposed around a signal line to reduce an insertion loss in a wireless communication system.

Additional aspects will be set forth in part in the description which follows and, in part, will be apparent from the description, or may be learned by practice of the presented embodiments.

Technical Solution

In accordance with an aspect of the disclosure, a transmission line structure of a wireless communication system is provided. The transmission line structure includes a ground area, a signal line, and a support. A first surface of the signal line is disposed to be spaced apart from the ground area via an air layer therebetween, a second surface of the signal line located opposite to the first surface is coupled to the support, and the support is coupled to the ground area.

In accordance with another aspect of the disclosure, an RF circuit of a wireless communication system is provided. The RF circuit includes a plurality of radio frequency (RF) components, and a transmission line structure. The transmission line structure includes a ground area, a signal line, and a support formed of a dielectric material, the plurality of RF components may be disposed on the transmission line structure, the plurality of RF components may be connected by the signal line, the first surface of the signal line is disposed to be spaced apart from the ground area via an air layer therebetween, a second surface of the signal line opposite to the first surface is coupled to the support, and the support is coupled to the ground area.

Advantageous Effects

A device according to various embodiments of the disclosure makes it possible to minimize the insertion loss of a transmission line by forming an air layer between the signal line and the ground area layer through a transmission line structure having a support, and to manufacture a transmission line in a cost-effective manner.

A device according to various embodiments of the disclosure makes it possible to configure the structure of a support according to the purpose by disposing Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the detail description of the drawings.

BEST MODE FOR CARRYING OUT THE INVENTION

Figure 1A:
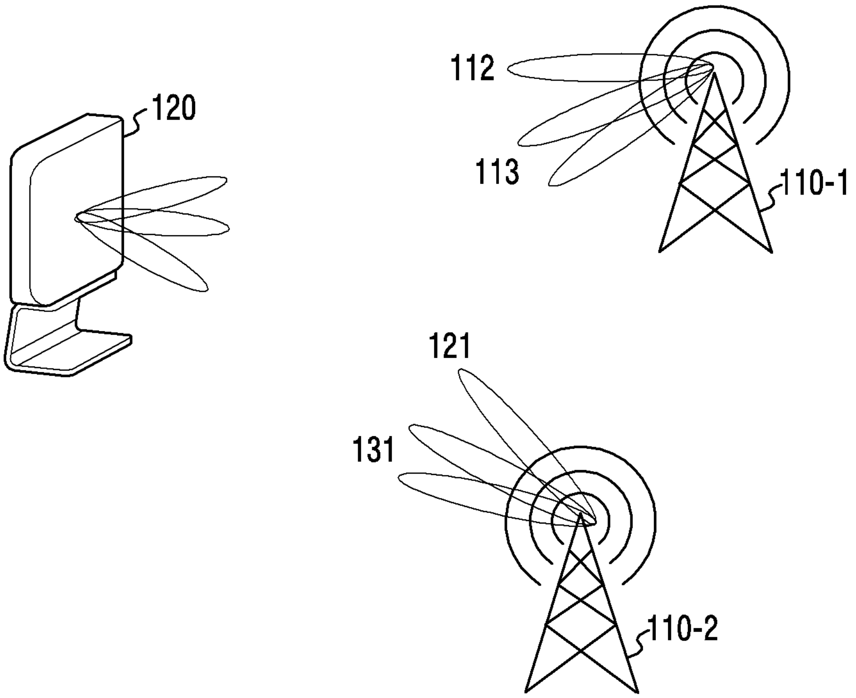
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these details are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Terms that refer to components of electronic devices used in the following description (e.g., "board structure", "substrate", "print circuit board (PCB)", "flexible PCB (FPCB)", "module, antenna", "antenna element", "circuit", "processor", "chip", "component", and "device"), terms that refer to the shapes of components (e.g., structure, structure object, support part, support, contact, protrusion, and opening), terms that refer to connections between structures (e.g., connecting line, feeding line, connection portion, contact portion, feeding unit, support part, support, contact structure, conductive member, and assembly), and terms that refer to a circuit (e.g., PCB, FPCB, signal line, feeding line, data line, transmission line, RF signal line, antenna line, RF path, RF module, and RF circuit) are exemplified for convenience of description. Accordingly, the disclosure is not limited to the terms to be used later, and other terms having equivalent technical meanings may be used. In addition, each of terms such as " . . . part", " . . . device", " . . . element", and " . . . body" used below may mean at least one shape structure or a unit for processing a function.

Hereinafter, in order to describe an antenna structure of the disclosure and an electronic device including the same, components of a base station will be described as an example, but various embodiments of the disclosure are not limited thereto. Of course, an antenna structure of the disclosure and an electronic device including the same may be applied to a terminal and equipment requiring a stable connection structure of terminals and other communication components for signal processing in addition to the base station.

FIG. 1A illustrates a wireless communication system according to an embodiment of the disclosure. FIG. 1A exemplifies a base station 110-1, a base station 110-2, and a terminal 120 as some of nodes using a wireless channel in a wireless communication system. Although FIG. 1A illustrates two base stations, other base stations that are the same as or similar to the base station 110-1 and the base station 110-2 may be further included. In addition, although FIG. 1A illustrates only one terminal, other terminals that are the same as or similar to the terminal 120 may be further included.

Referring to FIG. 1A, the base station 110-1 and the base station 110-2 are network infrastructures that provide wireless access to the terminal 120. The base station 110-1 and the base station 110-2 have a coverage defined as a certain geographic area based on a distance by which signals can be transmitted. Each of the base station 110-1 and the base station 110-2 may be referred as an "access point (AP)", an "eNodeB (eNB)", a "5th generation (5G) node", a "wireless point", a "transmission/reception point (TRP)", or other terms having the equivalent technical meaning, in addition to the term "base station".

The terminal 120 is a device used by a user, and communicates with the base station 110-1 and/or the base station 110-2 via wireless channels. The terminal 120 may be a mobile device or a fixed device. In some cases, the terminal 120 may be operated without user involvement. For example, the terminal 120 is a device that performs machine type communication (MTC) and may not be carried by a user. The terminal 120 may be referred to as a "user equipment (UE)", a "mobile station", a "subscriber station", a "remote terminal", a "wireless terminal", an "electronic device", a "user device", "customer premise equipment (CPE), or other terms having the equivalent technical meaning, in addition to the term "terminal".

The base station 110-1, the base station 110-2, and the terminal 120 may transmit and receive radio signals. In this case, in order to improve a channel gain, the base station 110-1, the base station 110-2, and the terminal 120 may perform beamforming. FIG. 1A illustrates transmission beams 112 and 113, which are formed by base station 110-1, and transmission beams 121 and 131, which are formed by base station 110-2. Here, the beamforming may include transmission beamforming and reception beamforming. That is, the base station 110-1, the base station 110-2, and the terminal 120 may impart directivity to a transmission signal or a reception signal. To this end, the base station 110-1, the base station 110-2, and the terminal 120 may select serving beams through a beam search or beam management procedure. After the serving beams are selected, subsequent communication may be performed via a resource in a quasi-co-located (QCL) relationship with a resource that transmitted the serving beams. For example, when large-scale characteristics of a channel which delivered a symbol on a first antenna port can be inferred from a channel which delivered a symbol on a second antenna port, the first antenna port and the second antenna port may be evaluated as being in a QCL relationship. For example, the large scale characteristics may include at least one of delay spread, Doppler spread, Doppler shift, average gain, average delay, spatial receiver parameter.

Figure 1B:
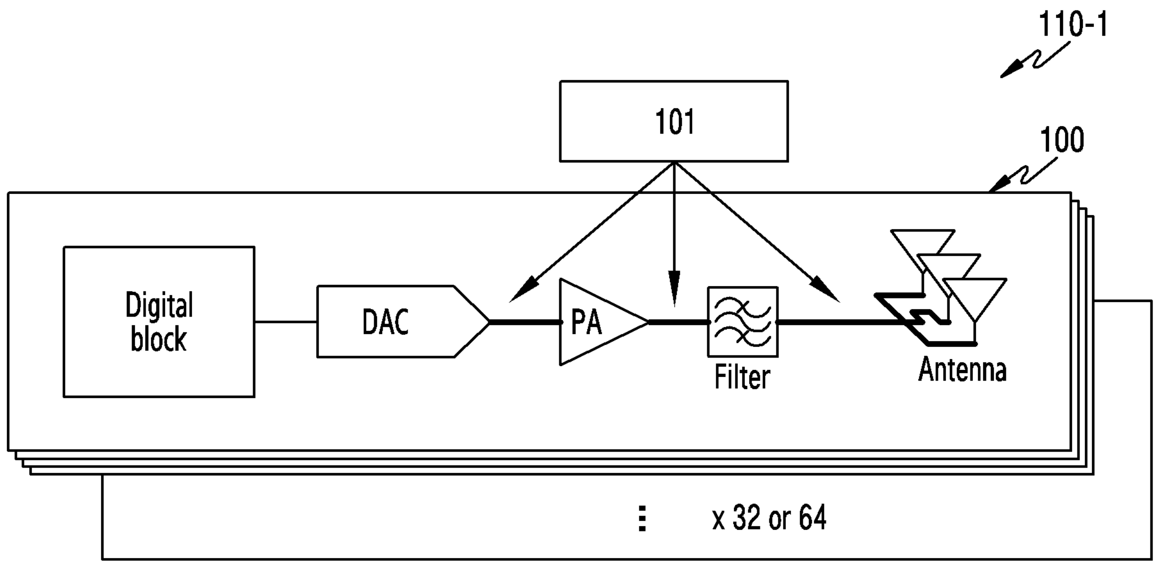
FIG. 1B is a block diagram illustrating a massive multiple-input multiple-output (MIMO) unit (MMU) in a wireless communication system according to an embodiment of the disclosure.

FIG. 1B is a block diagram illustrating a massive multiple-input multiple-output (MIMO) unit (MMU) in a wireless communication system according to an embodiment of the disclosure. FIG. 1B illustrates an RF signal transceiver provided in the base station 110-1 of FIG. 1A, for example, a part of a device such as an MMU, a radio unit (RU), an access point (AP), or a wireless backhaul.

Referring to FIG. 1B, a plurality of radio frequency (RF) components may be included in an MMU device. The RF components may perform a function for processing RF signals. According to an embodiment, the RF components may include a digital block, a digital to analog converter (DAC), a power amplifier (PA), a filter, an antenna, a radio frequency circuit 100, and a transmission line 101. However, the disclosure is not limited thereto, and the MMU device may include other RF components. For example, the RF components may include a mixer, an oscillator, an analog to digital converter (ADC), and the like. Hereinafter, the RF components illustrated in FIG. 1B will be described for convenience of description.

According to an embodiment, a plurality of RF components may be disposed in the RF circuit 100. Referring to FIG. 1B, an antenna, a filter, a PA, a DAC, and the like may be disposed in a single RF circuit 100. However, the disclosure is not limited thereto, and the components may be disposed in a plurality of RF circuits 100. For example, the antenna and filter may be disposed in a first RF circuit, and the PA and DAC may be disposed in a second RF circuit. According to an embodiment, a plurality of RF components may be connected by transmission lines 101. Referring to FIG. 1B, antennas, filters, PAs, and DACs may be connected to each other by transmission lines 101, respectively.

According to an embodiment, the MMU device may be configured with a plurality of RF circuits. For example, the MMU device may include 32 or 64 RF circuits 100 in each of which a plurality of RF components are disposed. That is, one RF circuit 100 may constitute one antenna element, and the MMU device may be configured with the plurality of antenna elements. Thus, the MMU device may be configured with the plurality of RF circuits 100.

According to an embodiment, the RF circuit 100 may include a plurality of layers. In this case, the plurality of layers may each be configured with a ground area and a dielectric layer. According to another embodiment, the transmission lines 101 may be included in the RF circuit 100. For example, the transmission lines 101 may be disposed to be coupled to at least some of the plurality of layers of the RF circuit 100. As another example, the transmission lines 101 coupled by another support or the like may be disposed to be spaced apart from at least some of the plurality of layers of the RF circuit 100. Accordingly, an air layer (an air gap) may be provided between the transmission lines 101 and the ground area.

Hereinafter, a structure of the support for reducing the insertion loss of the transmission lines 101 by providing an air layer between the transmission lines 101 and the ground area according to an embodiment of the disclosure will be described.

As will be described later, the insertion loss of a transmission line 101 may be related to a permittivity and a dielectric loss of a dielectric material that overlaps an electric field area generated in a signal line of a transmission line structure. Accordingly, in the area overlapping an electric field area generated by a transmission line 101, a medium may be formed of air in order to reduce the insertion loss. As described above, the insertion loss due to a transmission line 101 may be caused in all of the transmission lines 101 disposed to connect a plurality of RF components. Thus, it is important to reduce the insertion loss.

Figure 2A:
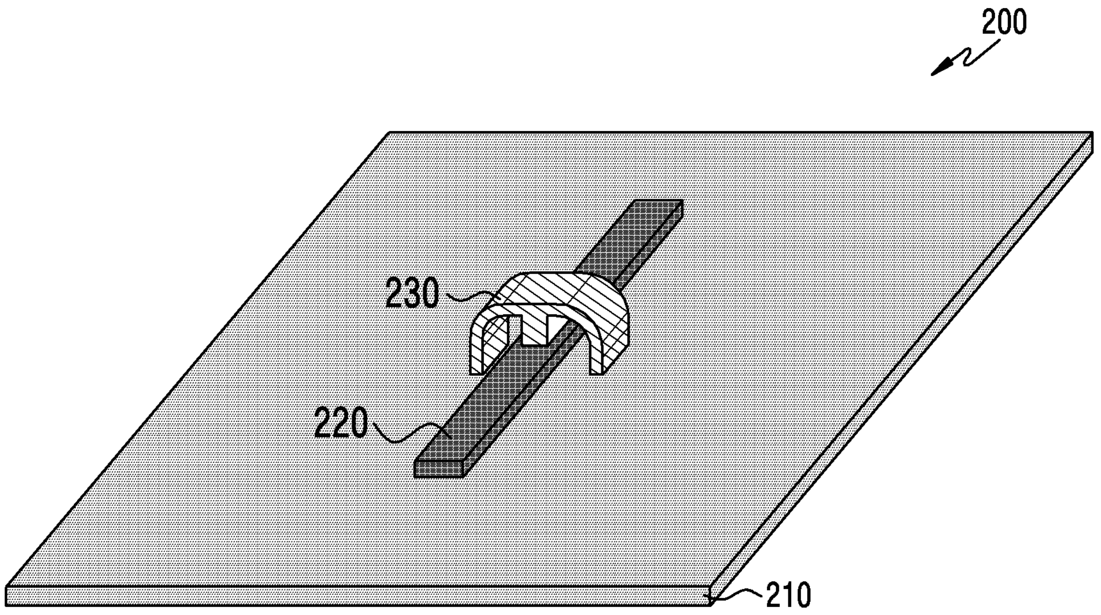
FIG. 2A is a perspective view of a transmission line structure according to an embodiment of the disclosure.
Figure 2B:
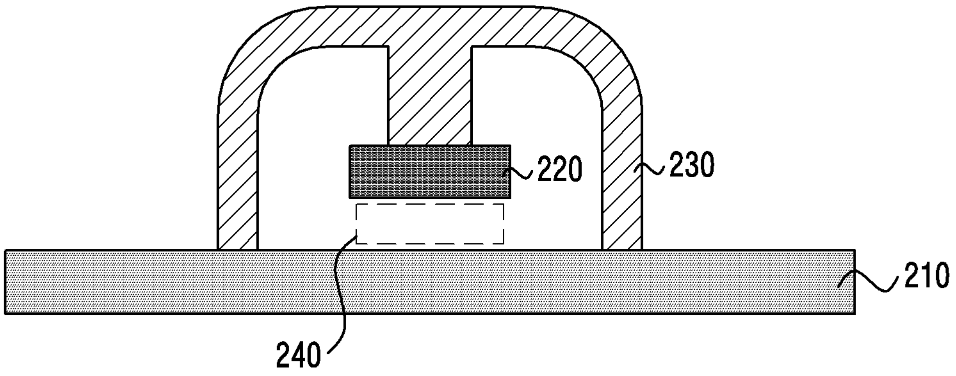
FIG. 2B is a front view of the transmission line structure according to an embodiment of the disclosure.
Figure 2C:
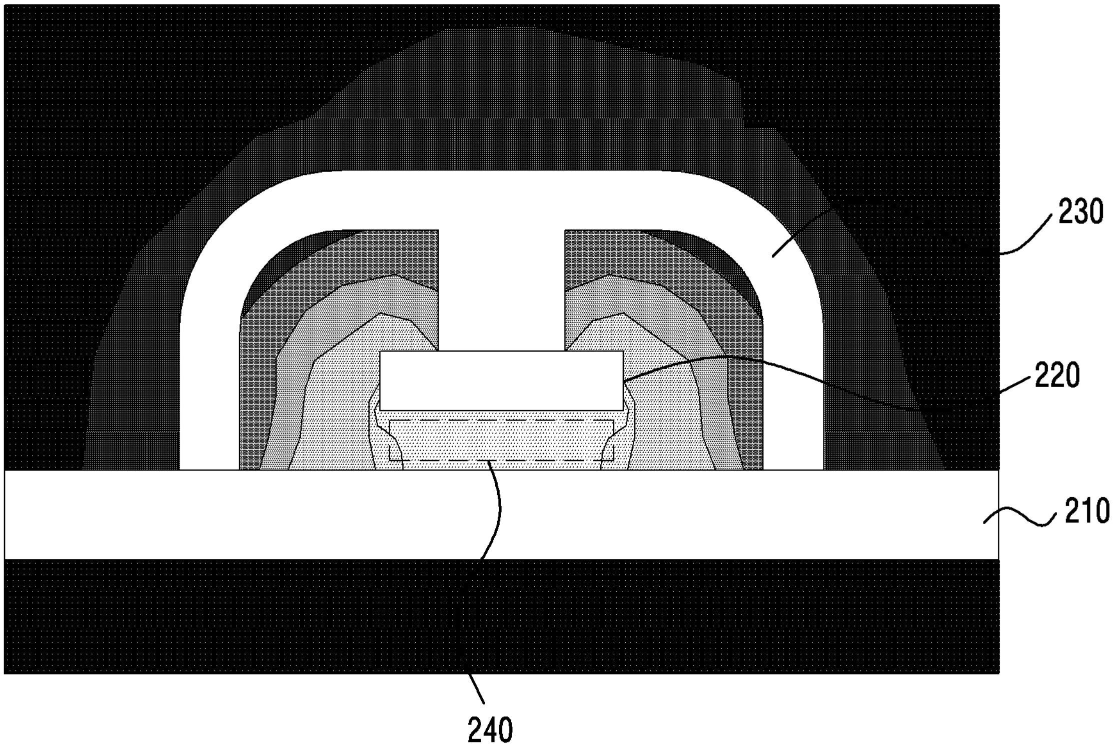
FIG. 2C illustrates an electric field distribution generated by a signal line of the transmission line structure according to an embodiment of the disclosure.

FIG. 2A is a perspective view of a transmission line structure according to an embodiment of the disclosure. FIG. 2B is a front view of the transmission line structure according to an embodiment of the disclosure. FIG. 2C illustrates an electric field distribution generated by a signal line of the transmission line structure according to an embodiment of the disclosure. FIGS. 2A to 2C illustrate a transmission line structure including one signal line, one support, and a ground area configured with one metal layer for convenience of description, but the disclosure is not limited thereto. For example, the transmission line structure may include a plurality of signal lines. In addition, for example, the transmission line structure may include a plurality of supports or a ground area configured with a plurality of metal layers. In addition, the transmission line structure may further include a layer other than the metal layer constituting the ground area.

Referring to FIG. 2A, a transmission line 200 may include a ground area 210, a signal line 220, and a support 230. According to an embodiment, the ground area 210 may be configured with at least one layer. For example, the ground area 210 may be configured with one metal layer. As another example, the ground area 210 may be configured with a plurality of layers including a metal layer. According to an embodiment, the insertion loss and impedance of the signal line 220 may be adjusted by the shape or material of the ground area 210.

Figure 13A:
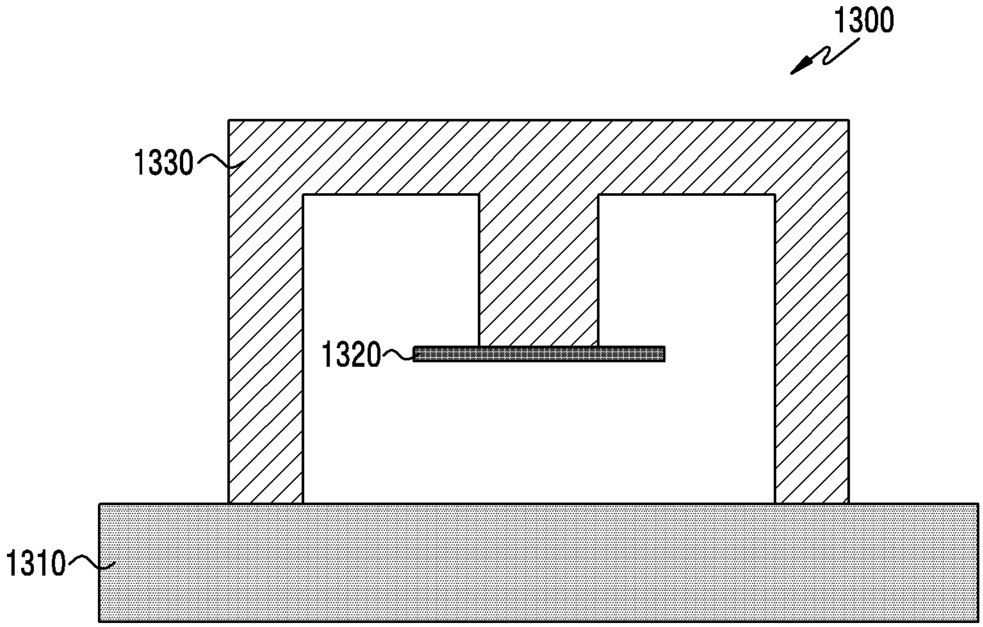
FIGS. 13A, 13B, and 13C illustrate examples of various structures of signal lines in transmission line structures according to various embodiments of the disclosure.
Figure 13B:
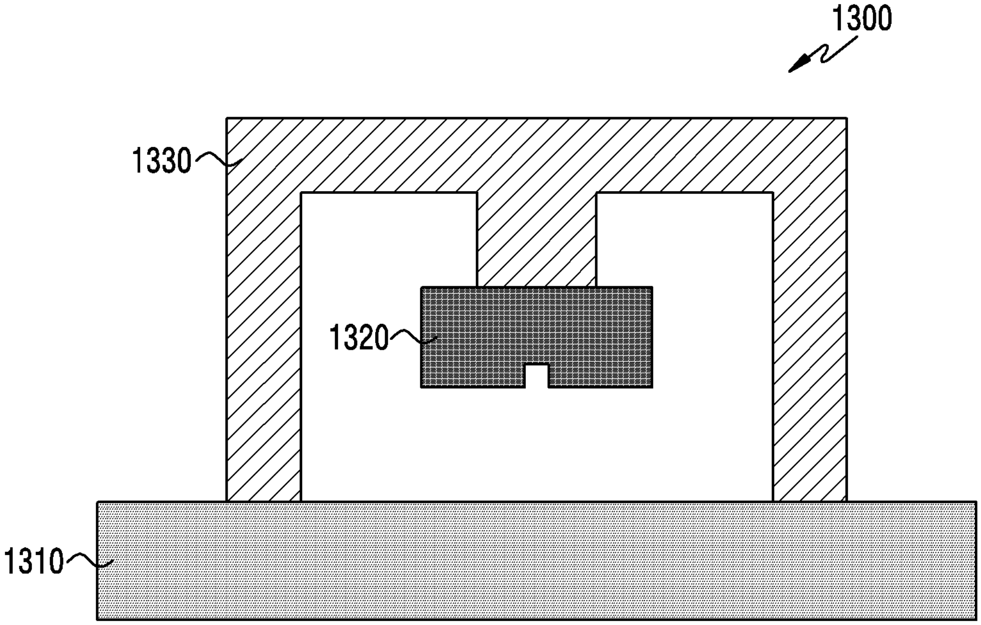
Figure 13C:
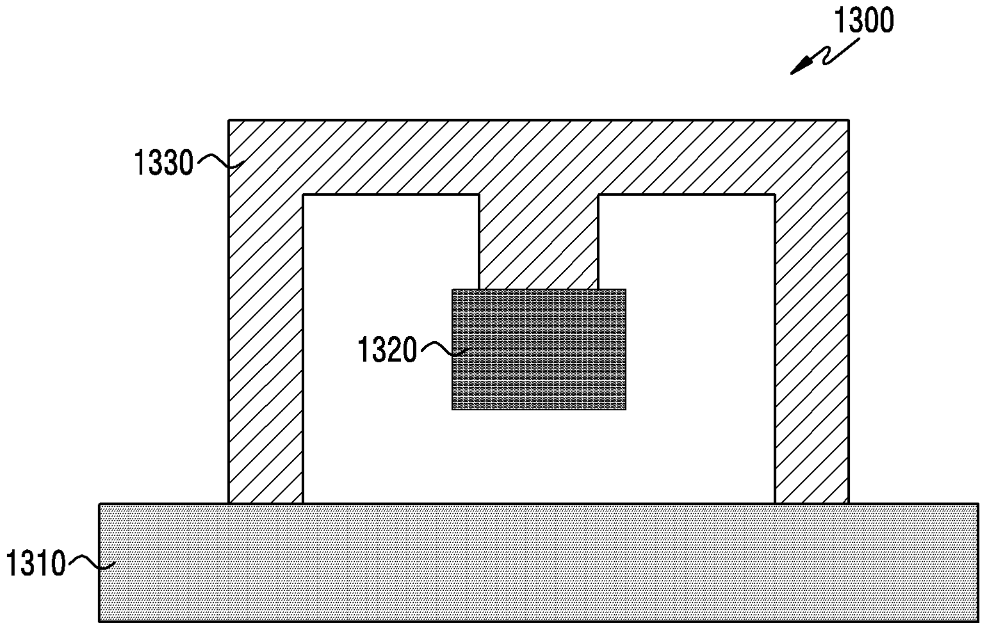

According to an embodiment, the signal line 220 may be formed of a conductive member in order to transmit an electrical signal. For example, the signal line 220 may be formed of metal. According to an embodiment, the signal line 220 may be formed in various structures. For example, as illustrated in FIG. 13A, the signal line 220 may have a "ㅡ" shape. In addition, for example, as illustrated in FIG. 13B, the signal line may have a shape obtained by rotating "ㄷ" by 90° in a clockwise direction. In addition, as illustrated in FIG. 13C, the signal line may have a "⊔" shape. However, the disclosure is not limited thereto, and the transmission line 200 may include a signal line 220 having a different structure. In the disclosure, for convenience of description, the signal line will be described with reference to the "ㅡ" shape. According to an embodiment, the first surface of the signal line 220 may be disposed in a direction corresponding to the ground area 210, and the second surface may be disposed in a direction opposite to the first surface. In addition, the third surface may be disposed in a direction perpendicular to the first surface and the second surface. As described above, the term, disposed, may have the same meaning as coupled, connected, attached, formed on, and the like.

According to an embodiment, the support 230 may be coupled to the ground area 210. Referring to FIG. 2A, a portion of the support 230 may be vertically coupled to the ground area 210. A portion of the support 230 may be coupled to the ground area 210 at a plurality of locations. However, the disclosure is not limited thereto, and a portion of the support 230 may be coupled to the ground area 210 at one location, or may be disposed not to be coupled to the ground area 210. According to an embodiment, the support 230 may be coupled to the signal line 220. For example, the support 230 may be coupled to the second surface of the signal line 220. As another example, the support 230 may be coupled to the third surface perpendicular to the first surface and the second surface of the signal line 220.

According to an embodiment, the support 230 may be formed of a dielectric material. The support 230 may be formed of a dielectric material having good moldability, and may have various shapes. For example, as illustrated in FIG. 11 to be described later, the support 230 may be coupled to the ground area 210 at a plurality of locations, or may be coupled to the ground area 210 at a single location. As another example, the support 230 may be coupled to the second surface of the signal line 220 at the center or the edges with reference to the width of the second surface of the signal line 220. As another example, the support 230 may be configured from the ground area 210 to the height of the second surface of the signal line 220, and in this case, may be coupled to the third surface of the signal line 220. As another example, the support may be provided to cover all of the second surface of the signal line 220.

According to an embodiment, in the transmission line 200, the signal line 220 and the support 230, and the support 230 and the ground area 210 may be coupled to each other by bonding, fusion, a fixing structure, or a screw. According to another embodiment, for coupling by a fixing structure, a screw, or the like, a coupling hole may be provided in each of the support 230 and the signal line 220.

FIG. 2B is a front view of the transmission line 200 of FIG. 2A. Referring to FIG. 2B, according to an embodiment, the transmission line 200 may include a ground area 210, a signal line 220, a support 230, and an air layer (air gap) 240. The air layer 240 may be provided between the ground area 210 and the signal line 220. Accordingly, while an electrical signal is being transmitted through the signal line 220, an insertion loss may be reduced due to the air layer, which is a medium having a low permittivity and loss tangent value. Therefore, it is possible to produce a transmission line having a higher transmission efficiency compared to a case in which a dielectric material formed of another medium (e.g., FR4) having a high permittivity and loss tangent value is disposed in an area adjacent to the signal line, and to produce a transmission line at a lower cost compared a case in which the dielectric material is formed using another medium (e.g., TEFLON™) having a low permittivity and loss tangent value.

FIG. 2C illustrates an electric field distribution generated when an electrical signal is transmitted through the transmission line 200 of FIG. 2A. Referring to FIG. 2C, according to an embodiment, the intensity of the generated electric field may be higher in an area closer to the first surface (the lower end) and the third surface (the side portion) of the signal line 220. That is, the intensity of the electric field generated in the air layer 240 of the transmission line 200 may be high. Whereas, the intensity of the electric field may be low on the second surface of the signal line 220. That is, in the area in which the signal line 220 and the support 230 are coupled to each other, the intensity of the electric field may be low.

As described above, a high electric field may be generated at the lower end (the first surface) and the side portion (the third surface) of the signal line. In the structure of a transmission line according to the prior art, a medium formed of a dielectric material exists between the signal line and the ground area, and an insertion loss may occur due to the medium having a permittivity. In addition, the structure of a transmission line configured with a medium having a low permittivity and loss tangent value in order to reduce the insertion loss may be high in production cost. According to an embodiment of the disclosure, in order to use air having a low permittivity and loss tangent as a medium, the ground area and the signal line may be spaced apart from each other via a support formed of a dielectric material, whereby it is possible to configure a structure of a transmission line using as a medium.

Hereinafter, with reference to FIGS. 3, 4A, 4B, 5A to 5C, 6A to 6C, 7A to 7C, 8A to 8C, 9, and 10, a power distribution according to an electric field generated by a signal line in order to reduce an insertion loss will be described, and disposition of a support for minimizing overlapping of the support with a place in which electric fields are concentrated while forming an air layer between the ground area and the signal line will be described.

Figure 3:
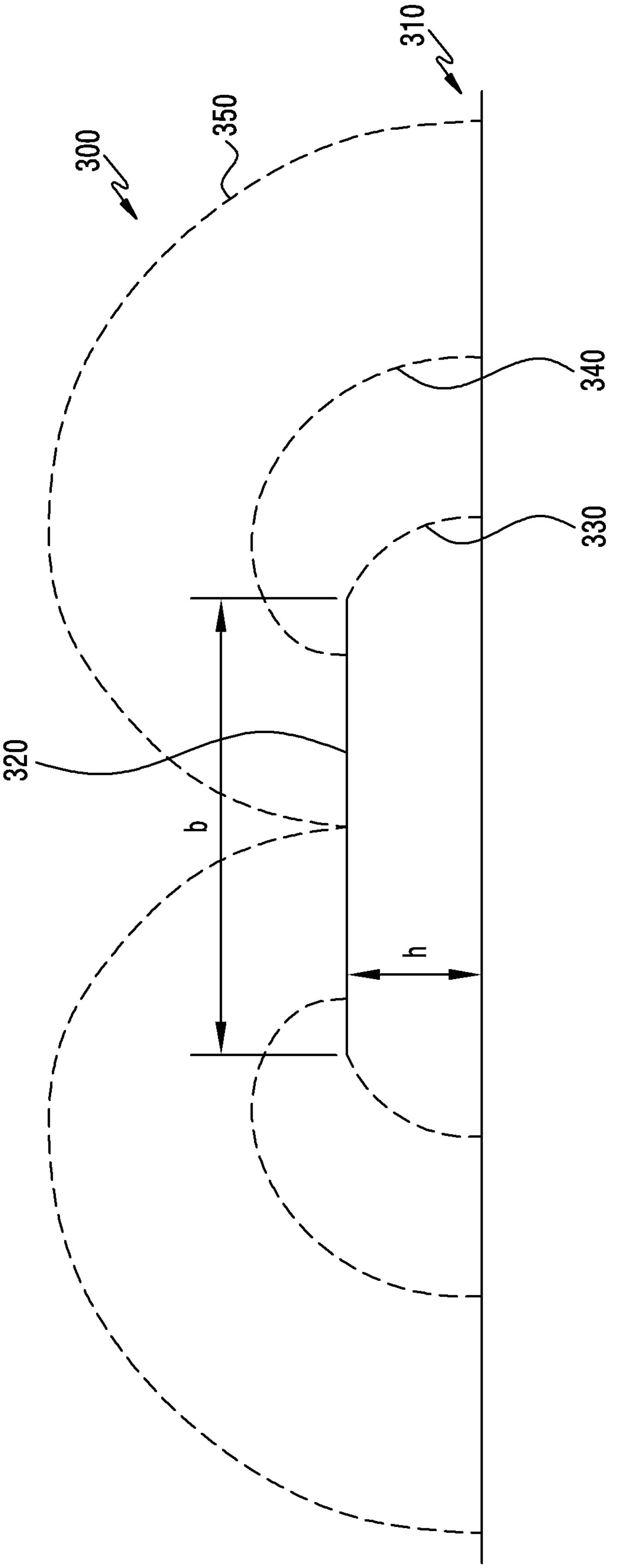
FIG. 3 illustrates a power flow generated between a signal line and a ground area according to an embodiment of the disclosure.

FIG. 3 illustrates a power flow generated between a signal line and a ground area according to an embodiment of the disclosure. Referring to FIG. 3, the signal line and the ground area are expressed as straight lines, but this is for convenience of description. The signal line and the ground area are not limited to a state in which the signal line and the ground area are provided on only one layer or have zero thicknesses.

Prior to the description of FIG. 3, it is noted that when an electrical signal is transmitted by the signal line 320, an electric field may be generated, and an insertion loss may occur depending on an area in which the electric field is generated and the medium having a permittivity overlap each other. Accordingly, the insertion loss is associated with dielectric properties and an electric field as is expressed in Equation 1 below.

$$P = \frac{1}{2}\left(\frac{\varepsilon}{\mu}\right)^{\frac{1}{2}} \int |E|^2 dS \qquad \text{Equation 1}$$

where P represents the insertion loss of the transmission line, ε represents the permittivity of the medium, μ represents the permeability of the medium, E represents the electric field generated by the transmission line, and S represents the area in which the electric field is formed.

Considering the above equation, the insertion loss may be proportional to the permittivity of the medium existing in the area overlapping the electric field generated by the transmission line, and may be inversely proportional to the magnetic permeability. In addition, the insertion loss may be proportional to the intensity of the electric field generated by the transmission line. That is, in order to reduce the insertion loss, it is necessary to form an area overlapping the area in which the electric field is generated using a medium having a low permittivity or to minimize the dielectric material provided in the overlapping area.

FIG. 3 illustrates a power flow due to an electric field generated by the signal line 320, which is disposed to be spaced apart from the ground area 310. In this case, it is assumed that the interval between the ground area 310 and the signal line 320, that is, the height on which the signal line 320 is disposed, is h, and the width of the signal line 320 is b. According to an embodiment, the relation between the width b and the height h may be determined to satisfy b/h=3.44. Hereinafter, for convenience of description, a transmission line 300 having a structure including a signal line 320 and a ground area 310 in a state where b/h=3.44 is satisfied will be described. However, the transmission line 300 having the structure according to an embodiment of the disclosure is not limited thereto.

Referring to FIG. 3, a first power flow distribution 330 defined by a curves directed from opposite ends of the signal line 320 toward the ground area 310, a second power flow distribution 340 defined by curves directed from points located between the opposite ends of the signal line 320 and the center of the signal line 320 toward the ground area 310, and a third power flow distribution 350 defined by curves directed from the center of the signal line 320 toward the ground area 310 may be formed. According to an embodiment, about 75% of the power generated by the electric field generated by the signal line 320 may be generated in the first power flow distribution 330. According to another embodiment, about 90% of the power may be generated in the second power flow distribution 340. That is, about 15% of power may be generated in the area between the first power flow distribution 330 and the second power flow distribution 340. According to another embodiment, about 100% of the power may be generated in the third power flow distribution 350. That is, about 10% of power may be generated in the area between the second power flow distribution 340 and the third power flow distribution 350.

In other words, as described above with reference to FIG. 3, it may be understood that a distribution in which an electric field is actually generated and a distribution of a power flow have similar shapes. For example, in the area between the signal line 320 and the ground area 310, most of the electric power may be distributed, and the intensity of the generated electric field may be high. In addition, on the side surfaces of the signal line 320, a high level of power may be distributed, and the intensity of the generated electric field may be high. In contrast, in the upper end portion of the signal line 320, that is, in a direction opposite to the direction facing the ground area 310, a low level of power may be distributed and the intensity of the generated electric field may be low. Therefore, in measuring the insertion loss, the magnitude of the insertion loss due to the dielectric may be measured by replacing the intensity of the electric field with a power distribution ratio.

Figure 4A:
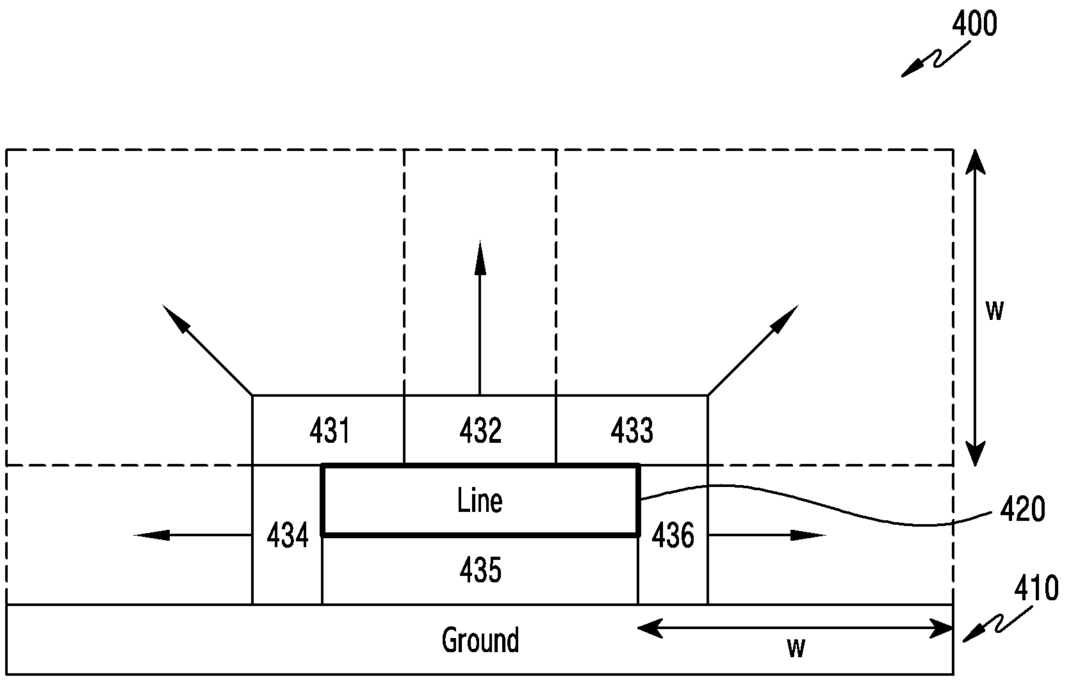
FIG. 4A illustrates an example of an area adjacent to a signal line according to an embodiment of the disclosure.
Figure 4B:
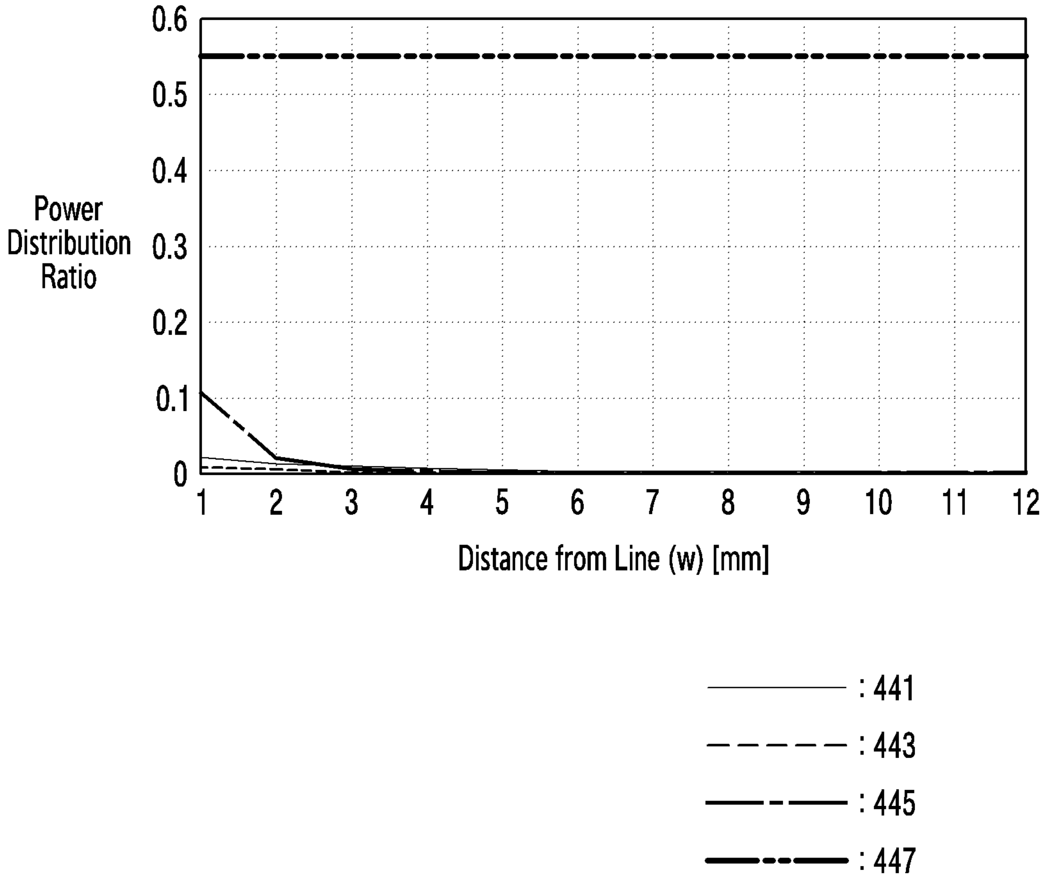
FIG. 4B illustrates power distribution ratios according to a distance from a signal line of a plurality of areas according to an embodiment of the disclosure.

With reference to FIGS. 4A and 4B, a power distribution ratio according to the distance from the signal line in each of subdivided areas obtained by subdividing an area adjacent to the signal line will be described.

FIG. 4A illustrates an example of an area adjacent to a signal line according to an embodiment of the disclosure. FIG. 4B illustrates a power distribution ratio according to a distance from a signal line of a plurality of areas according to an embodiment of the disclosure. Referring to FIGS. 4A and 4B, for convenience of description, a transmission line structure including a "- -" shaped signal line having a thickness is disclosed, and it is assumed that the remaining area of the transmission line structure, except for the signal line and the ground area, is formed of air. However, the disclosure is not limited thereto, and the transmission line structure may include a signal line having other shapes, and the medium may be formed of a dielectric material, other than air.

Referring to FIG. 4A, a transmission line 400 may include a ground area 410 and a signal line 420. According to an embodiment, an area adjacent to the signal line 420 may be subdivided into a plurality of areas. For example, the plurality of areas may include a first area 431, a second area 432, a third area 433, a fourth area 434, a fifth area 435, and a sixth area 436. However, the disclosure is not limited thereto, and when the plurality of subdivided areas are more than six areas, a more accurate power distribution ratio may be measured.

According to an embodiment, the first area 431 may be defined along the signal line 420 from the left portion of the second area 432 and may be defined to be in contact with the fourth area 434. The second area 432 may be defined starting from the center of the signal line 420 to the opposite sides to have a length of half the width of the signal line 420. According to an embodiment, the second area 432 may have a width for forming a power distribution ratio of about 6%. In addition, according to an embodiment, the second area 432 may mean an area coupled to the support. However, the disclosure is not limited thereto. For example, the support may be coupled to at least a portion of the first area 431 or the third area 433 including the second area 432. As another example, the support may be coupled to at least a portion of the first area 431 or the third area 433, but may not be coupled to the second area 432.

The third area 433 may be formed along the signal line 420 from the right portion of the second area 432 and to be in contact with the sixth area 436. The third area 433 may be formed to correspond to the first area 431 with reference to the second area 432. The fourth area 434 may be formed in a direction parallel to the ground area 410 from an area vertically connected to the ground area 410 on the left surface of the signal line 420.

The fifth area 435 may be defined by an area vertically connected to the ground area 410 at the opposite ends of the signal line 420. In addition, the fifth area 435 may mean an air layer provided between the signal line 420 and the ground area 410. For example, the height of the fifth area 435 may be about 1 mm. This may be determined such that the impedance of the transmission line 400 has a value of about 50Ω. When the transmission line 400 has an impedance value of about 33Ω, the efficiency of power transfer is the best, and when the impedance value is about 75Ω, the distortion of a signal waveform may be minimized. Accordingly, when the transmission line 400 has an intermediate value of about 50Ω, the transmission line 400 may generate a signal waveform having high power transmission efficiency and low distortion. However, the disclosure is not limited thereto. For example, when the height of the fifth area 435 is increased, the power distribution ratio of the first to third areas 431 to 433 may be increased and the power distribution ratio of the fifth area 435 may be decreased. In addition, the impedance of the transmission line 400 may be increased.

The sixth area 436 may be defined in a direction parallel to the ground area 410 from an area vertically connected to the ground area 410 on the right surface of the signal line 400. The sixth area 436 may be defined to correspond to the fourth area 434 with reference to the fifth area 435. In addition, referring to FIG. 4A, w may indicate a distance in a direction away from the signal line 420 with respect to the remaining area, except for the fifth area 435.

FIG. 4B shows an example of a graph indicating power distribution ratios in the first area 431 and the third area 433. The horizontal axis of the graph represents the distance w (unit: mm) from the signal line, and the vertical axis represents a power distribution ratio.

Referring to FIG. 4B, in the graph, a first line 441 indicating the power distribution ratio in the first area 431 and the third area 433, a second line 443 indicating the power distribution ratio in the second area 432, a third line 445 indicating a power ratio in the fourth area 434 and the sixth area 436, and a fourth line 447 indicating the power distribution ratio in the fifth area 435 are illustrated. At this time, as described above, it is assumed that, in order to make the transmission line 400 have an impedance of about 50Ω, the area of the fifth area 435 is fixed, and the fifth area 435, that is, the air layer (air gap) has a height of about 1 mm.

Referring to the first line 441, when the distance w, shown vertically in FIG. 4A, is about 1 mm, the power distribution ratio in the first area 431 and the third area 433 may be about 3%. In addition, as the distance w increases, the power distribution ratio may be lowered. Referring to the second line 443, when the distance is about 1 mm, the power distribution ratio in the second area 432 may be about 2.5%. In addition, as the distance is increased, the power distribution ratio may be lowered. Referring to the third line 445, when the distance w, shown horizontally in FIG. 4A, is about 1 mm, the power distribution ratio in the fourth area 434 and the sixth area 436 may be about 10%. In addition, as the distance is increased, the power distribution ratio may be lowered. Referring to the fourth line 447, when the distance is about 1 mm, the power distribution ratio in the fifth area 435 may be about 55%. In other words, the closer to the signal line 420, the power distribution ratio may be increased, and the greater the distance, the power distribution ratio may be lowered. In addition, power distribution ratios may be high on the bottom surface (e.g., the fifth area 435) and the side surfaces (e.g., the fourth area 434 and the sixth area 436) of the signal line 420.

Hereinafter, in FIGS. 5A to 5C, and 6A to 6C, in consideration of a power distribution ratio according to a distance from each area described above, the power distribution ratios and the electric field distributions of different structures will be described, and the insertion loss caused thereby will be described.

Figure 5A:
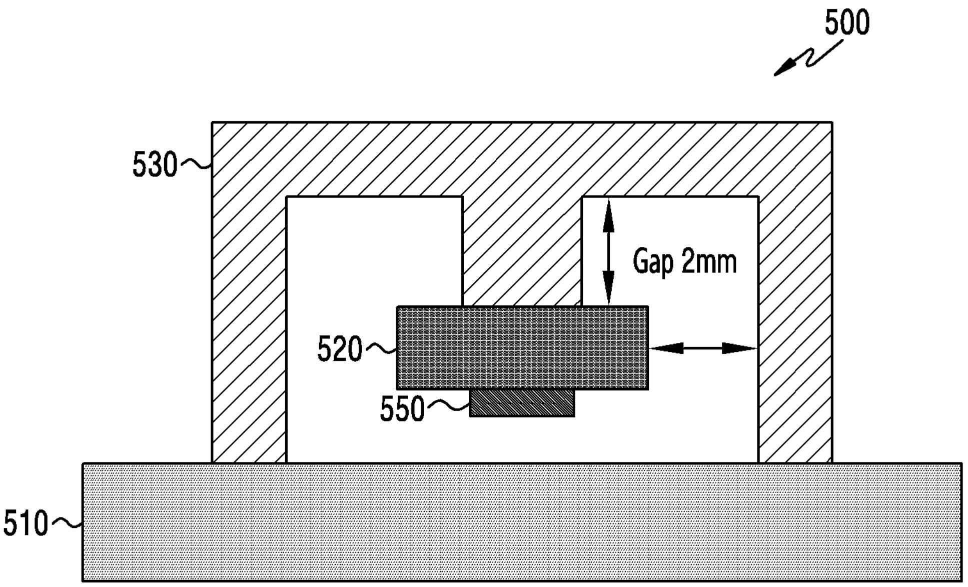
FIGS. 5A and 5B are front views of an example of a transmission line structure according to various embodiments of the disclosure.
Figure 5B:
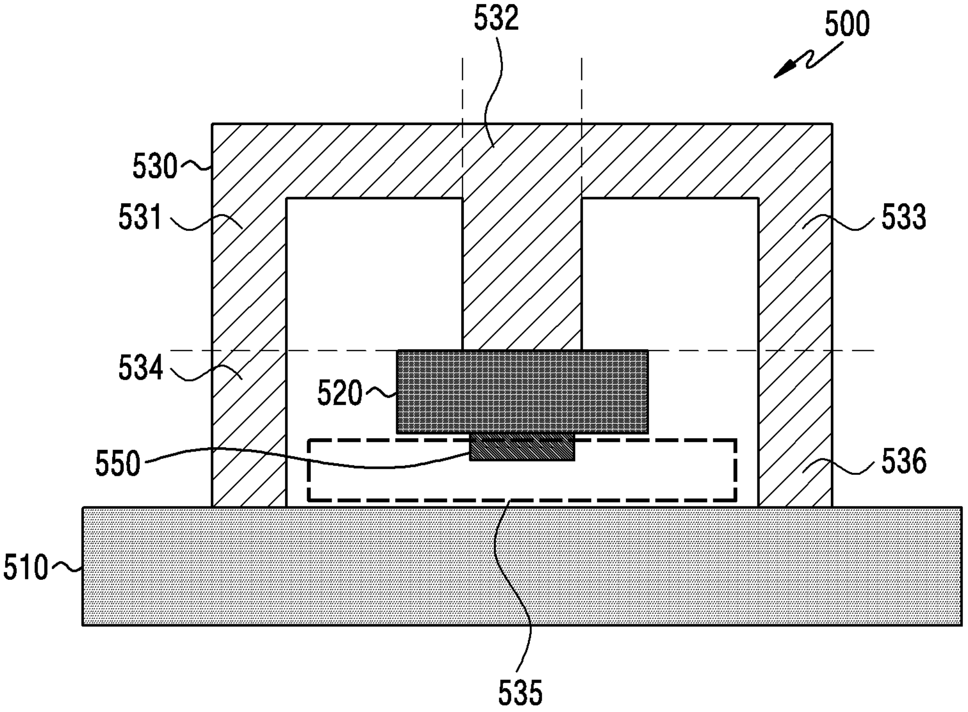
Figure 5C:
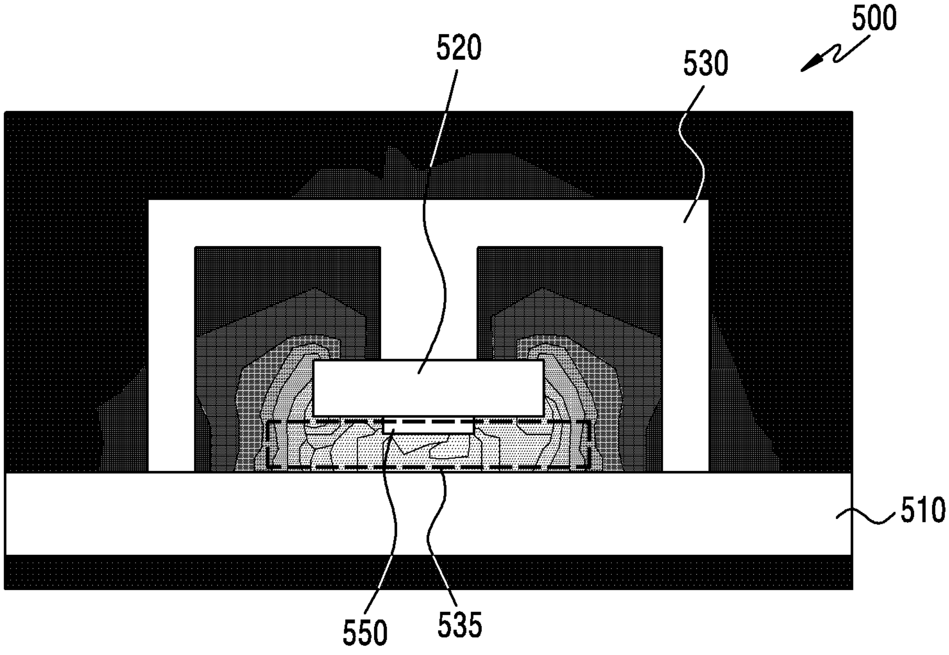
FIG. 5C illustrates an example of an electric field distribution generated by a signal line of the transmission line structure according to an embodiment of the disclosure.
Figure 6A:
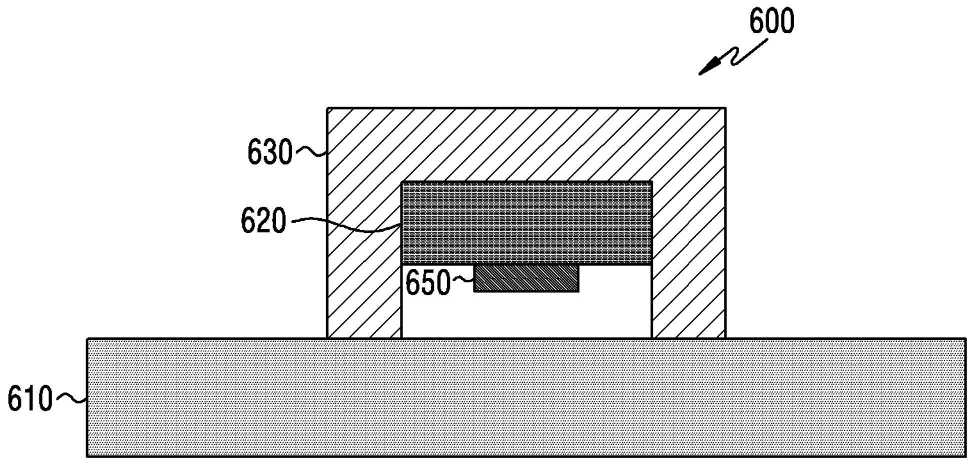
FIGS. 6A and 6B are front views of an example of a transmission line structure according to various embodiments of the disclosure.
Figure 6B:
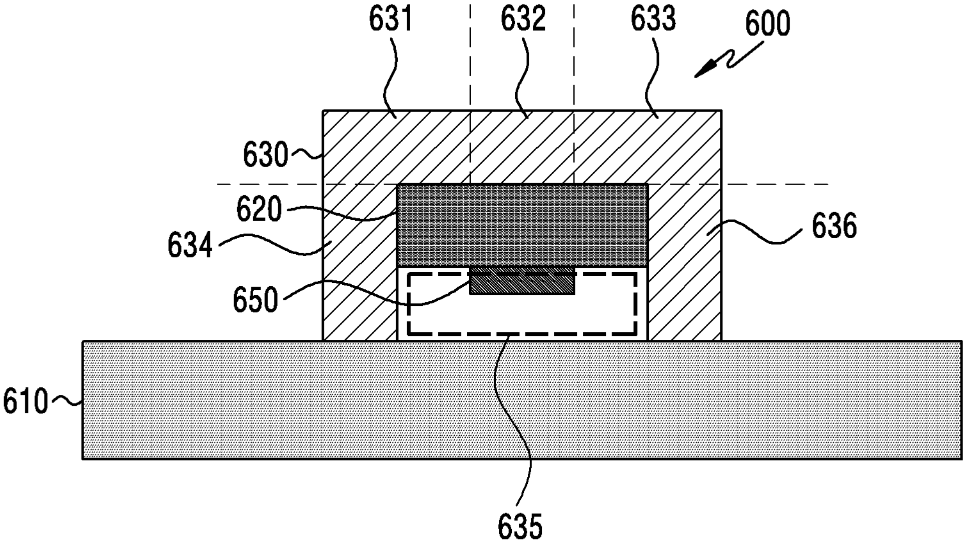
Figure 6C:
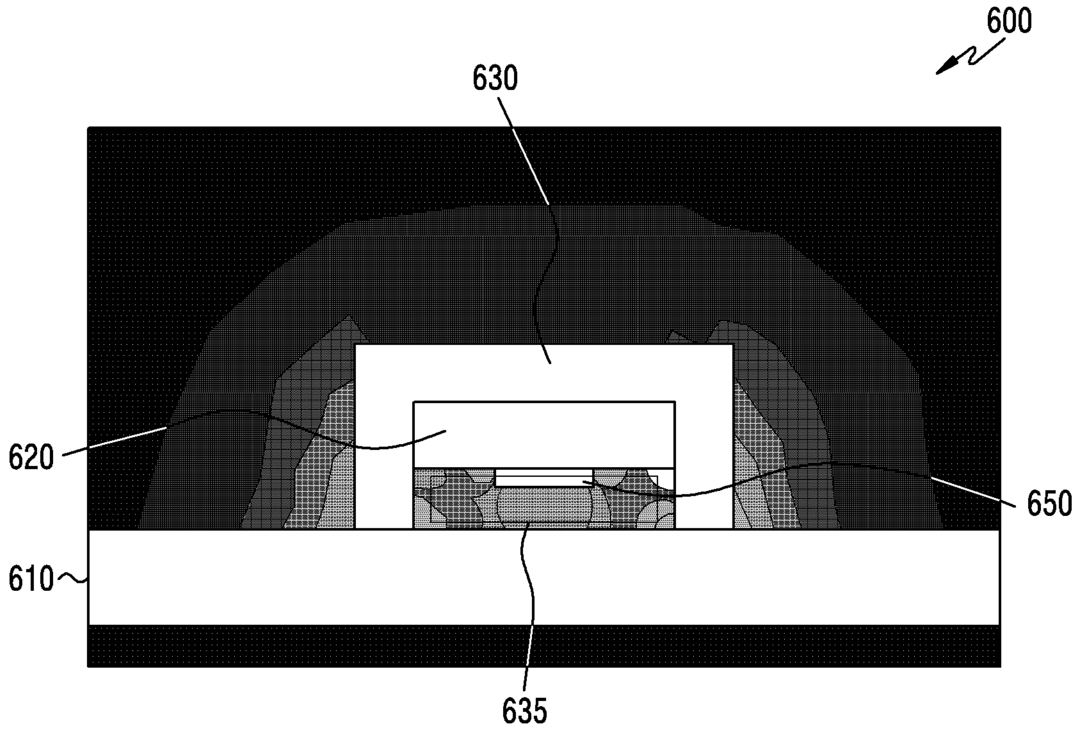
FIG. 6C illustrates an example of an electric field distribution generated by a signal line of the transmission line structure according to an embodiment of the disclosure.

FIGS. 5A and 5B are front views of an example of a transmission line structure according to various embodiments of the disclosure. FIG. 5C illustrates an example of an electric field distribution generated by a signal line of the transmission line structure according to an embodiment of the disclosure. FIGS. 6A and 6B are front views of an example of a transmission line structure according to various embodiments of the disclosure. FIG. 6C illustrates an example of an electric field distribution generated by a signal line of the transmission line structure according to an embodiment of the disclosure. Referring to FIGS. 5A to 5C, and 6A to 6C, for convenience of description, a transmission line structure including a “ - - ” shaped signal line having a thickness is disclosed, and it is assumed that the remaining area of the transmission line structure, except for the signal line and the ground area, is formed of air. However, the disclosure is not limited thereto, and the transmission line structure may include a signal line having other shapes, and the medium may be formed of a dielectric material, other than air.

Referring to FIGS. 5A and 5B, a transmission line 500 may include a ground area 510, a signal line 520, and a support 530, and may include a fixing member 550 for coupling and fixing the support 530 and the signal line 520 at the lower end portion of the signal line 520. FIG. 5A illustrates a 2 mm gap between the support 530 and the signal line 520. According to an embodiment, the fixing member 550 may be formed of a dielectric material. In addition, a coupling hole (not illustrated) may be provided in a portion of the signal line 520 and the support 530 in order to couple the fixing member 550. An insertion loss to be described later may include a loss due to the fixing member 550.

According to an embodiment as illustrated in FIG. 5B, the support 530 of the transmission line 500 may include a first area 531, a second area 532, a third area 533, a fourth area 534, and a sixth area 536. In this case, the interval between the second area 532 and the signal line 520 may be about 2 mm, and the interval between the fourth area 534 and the sixth area 536 may be about 2 mm.

According to an embodiment, referring to FIG. 4B, the total power distribution ratio for the support 530 illustrated in FIG. 5B may be about 4.6%. The total power distribution ratio for the support 530 illustrated in FIG. 5B may be calculated by adding the values of about 3 mm points of respective lines in FIG. 4B. Accordingly, when a signal having a frequency band of about 3.7 MHz is transmitted through the signal line 520, the insertion loss of the signal line 520 may be about 0.086 dB.

FIG. 5C shows an electric field distribution for the transmission line 500 illustrated in FIGS. 5A and 5B. It can be seen that the intensity of the electric field generated by the signal line 520 is high in the lower end portion of the signal line 520, that is, in the fifth area 535. In addition, it can be seen that the intensity of the electric field is high in opposite side portions of the signal line 520.

In contrast, referring to FIGS. 6A and 6B, a transmission line 600 may include a ground area 610, a signal line 620, and a support 630, and may include a fixing member 650 for coupling and fixing the support 630 and the signal line 620 the signal line 620. According to an embodiment, the fixing member 650 may be formed of a dielectric material. In addition, a coupling hole (not illustrated) may be provided in a portion of the signal line 620 and the support 630 in order to couple the fixing member 650. An insertion loss to be described later may include a loss due to the fixing member 650.

According to an embodiment as illustrated in FIG. 6B, the support 630 of the transmission line 600 may include a first area 631, a second area 632, a third area 633, a fourth area 634, and a sixth area 636. In this case, the second area 632 and the signal line 620 may not be spaced apart from each other, and the fourth area 634 and the sixth area 636 may not be spaced apart from the signal line 620.

According to an embodiment, referring to FIG. 4B, the total power distribution ratio for the support 630 illustrated in FIG. 6B may be about 27.1%. The total power distribution ratio for the support 630 illustrated in FIG. 6B may be calculated by adding the values of about 1 mm points of respective lines in FIG. 4B. Accordingly, when a signal having a frequency band of about 3.7 MHz is transmitted through the signal line 620, the insertion loss of the transmission line 600 may be about 0.206 dB. That is, when compared with FIG. 5B, the higher the power distribution ratio of the support, the insertion loss may be increased.

FIG. 6C shows an electric field distribution for the transmission line 600 illustrated in FIGS. 6A and 6B. It can be seen that the intensity of the electric field generated by the signal line 620 is high in the lower end portion of the signal line 620, that is, in the fifth area 635. In addition, it can be seen that the intensity of the electric field is high in opposite side portions of the signal line 620. Accordingly, as the permittivity and dielectric loss of the dielectric medium disposed in the area overlapping the area having a high electric field intensity are lowered, the insertion loss may be reduced. In other words, when an air layer is formed in an area adjacent to the signal line, the insertion loss may be reduced.

When comparing FIGS. 6C and 5C, the intensity of the electric fields generated in the fifth areas 535 and 635 of respective figures may be similar to each other, but the intensities of the electric fields generated in the remaining area, except for the fifth areas 535 and 635, may be higher in FIG. 5C. That is, as the interval between the signal line and the support is increased, the air layer formed as a medium may be wider, the power distribution ratio of the support may be low, and the intensity of the electric field may be high. In other words, as the interval between the signal line and the support is increased, the power loss may be reduced.

As described above, an electric field may be generated by the transmission line, and the insertion loss of the transmission line may be related to a power distribution ratio generated in the support by the electric field. According to an embodiment, the insertion loss caused by the support and the signal line may be determined through a process of measuring a power distribution ratio of a dielectric area with respect to a transmission line structure in which the area other than a signal line and a ground area is provided as a dielectric area, a process of subdividing the support formed of a dielectric material into a plurality of segments and measuring the power distribution ratio in each segment, and a process of measuring the insertion loss of only the signal line.

Hereinafter, with reference to FIGS. 7A to 7C, 8A to 8C, 9, and 10, the processes of determining an insertion loss caused by a support and a signal line in a transmission line structure in which an air layer formed by the support according to the above-described measurement processes will be described.

Figure 7A:
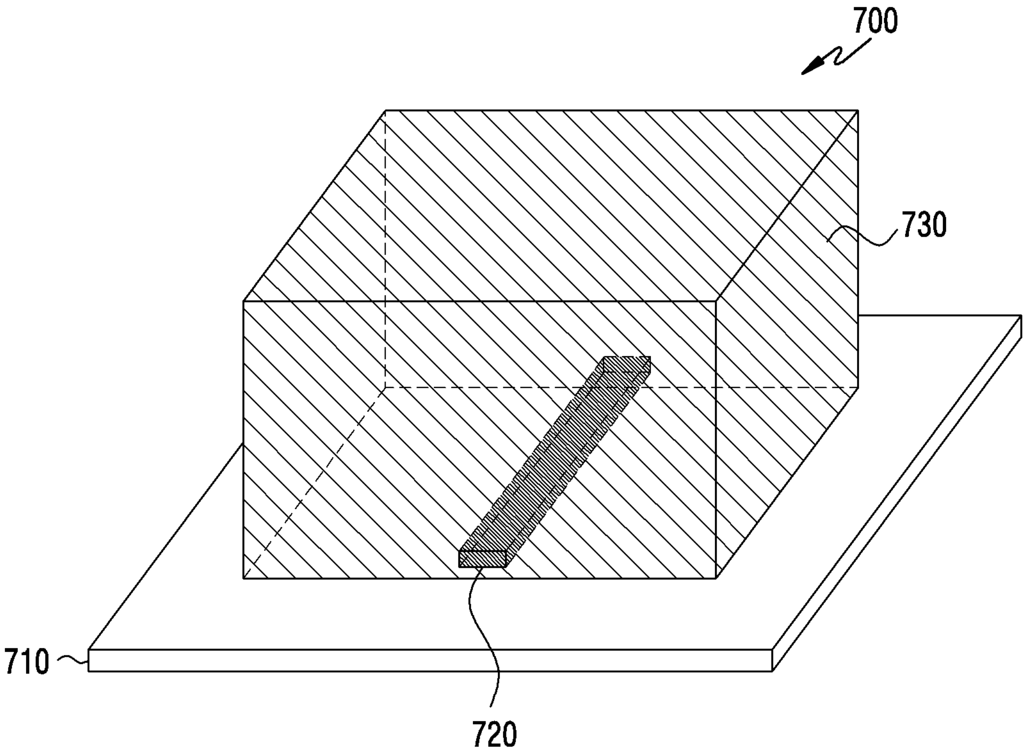
FIG. 7A is a perspective view of a transmission line structure in which an area other than a signal line and a ground area is formed of a dielectric material according to an embodiment of the disclosure.
Figure 7B:
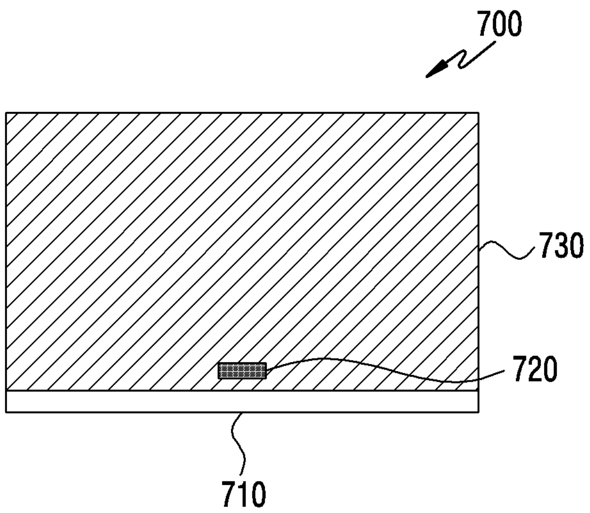
FIG. 7B is a front view of a transmission line structure in which an area other than a signal line and a ground area is formed of a dielectric material according to an embodiment of the disclosure.
Figure 7C:
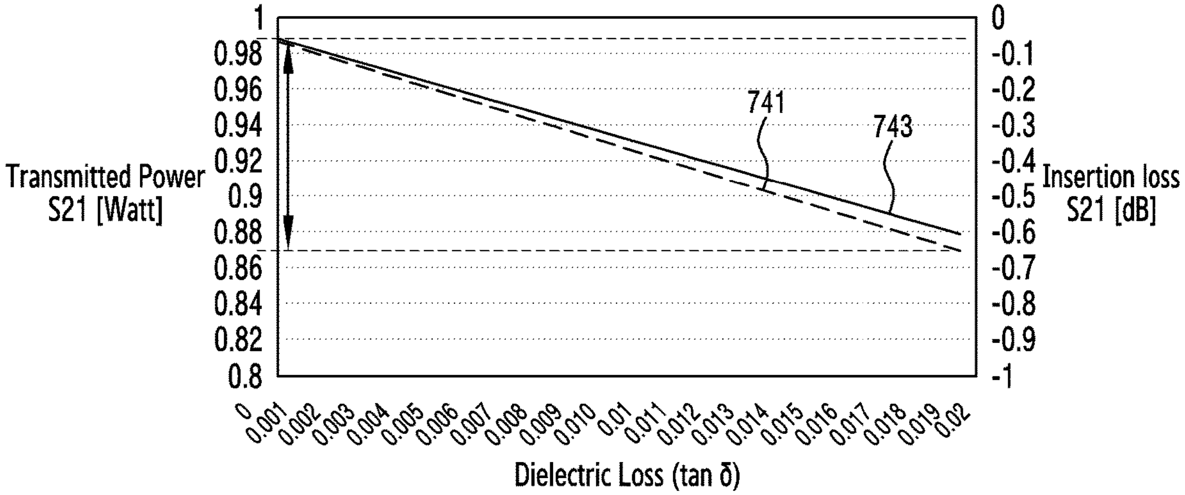
FIG. 7C illustrates transmission performance according to the dielectric loss of the dielectric material of the transmission line structure according to an embodiment of the disclosure.

FIG. 7A is a perspective view of a transmission line structure in which an area other than a signal line and a ground area is formed of a dielectric material according to an embodiment of the disclosure. FIG. 7B is a front view of a transmission line structure in which an area other than a signal line and a ground area is formed of a dielectric material according to an embodiment of the disclosure. FIG. 7C illustrates transmission performance according to the dielectric loss of the dielectric material of the transmission line structure according to an embodiment of the disclosure. For convenience of description, in FIGS. 7A and 7B, the length of the signal line is 81 mm, the ratio (w/h ratio) of the width w and the height h of the signal line is 4.1, and the dielectric material of the dielectric area has a relative permittivity $\varepsilon_r$ of 1 and a loss tangent (tan δ) value of 0 to 0.02. The dielectric space may be defined as a space having a length of 12 mm to the top side, left side, and right side from the signal line such that a power distribution ratio of about 99% or more is formed relative to an infinite space. However, the disclosure is not limited thereto, and is merely specified as a reference in order to describe a measurement result.

FIG. 7A is a perspective view illustrating a transmission line 700 in a three dimensional structure, and FIG. 7B is a front view of the transmission line 700. The transmission line 700 may include a ground area 710, a signal line 720, and a dielectric area 730.

FIG. 7C is a graph showing transmitted power S21 on the left vertical axis and an insertion loss S21 on the right vertical axis according to a dielectric loss (i.e., loss tangent) for the dielectric area 730 of the transmission line 700 illustrated in FIGS. 7A and 7B. The horizontal axis of the graph represents a dielectric loss (tan δ), the left vertical axis represents transmitted power (unit: Watt), and the right vertical axis represents an insertion loss (unit: dB).

Referring to FIG. 7C, in the graph, a fifth line 741 indicating transmitted power according to a dielectric loss in the dielectric area 730, and a sixth line 743 indicating an insertion loss according to a dielectric loss in the dielectric area 730 are illustrated. The fifth line 741 indicates an output result when power of 1 W is input to the transmission line 720.

Referring to the fifth line 741, for example, when the dielectric loss has a value of 0, the output transmitted power may be about 0.99 W. That is, when there is no dielectric loss, it may mean that loss is caused due to only the signal line 720. As another example, when the dielectric loss has a value of 0.02, the output transmitted power may be about 0.87 W. In other words, the difference between the case in which the dielectric loss has a value of 0.02 and the case in which the dielectric loss has a value of 0 may mean the power distribution of the dielectric area 730, and the power distribution of the dielectric area 730 may be about 0.117 W. In addition, as the dielectric loss is increased, the output transmitted power may be lowered at a constant ratio relative to the power input to the signal line 720. Accordingly, even when the type of the dielectric material of the dielectric area 730 is changed, the transmitted power may be predicted.

Referring to the sixth line 743, as described above, the insertion loss in the case in which the dielectric loss has a value of 0 may mean a loss due to the signal line 720, and may be about 0.0585 dB. In other words, the insertion loss by the signal line 720 may be about 0.0585 dB.

Accordingly, the power distribution ratio of the entire dielectric area and the insertion loss of the signal line in the transmission line in which the remaining area, except for the ground area and the transmission line, is formed of a dielectric material have been described with reference to FIGS. 7A to 7C. Hereinafter, a power distribution ratio relationship in an area corresponding to the support rather than the entire dielectric area will be described with reference to FIGS. 8A to 8C.

Figure 8A:
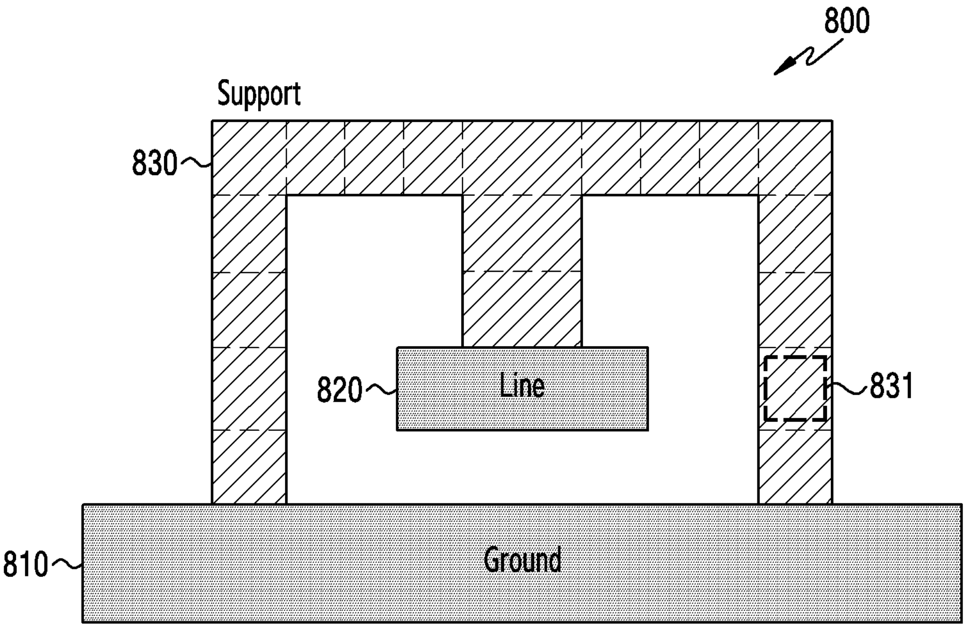
FIG. 8A illustrates an example of a transmission line structure including a support including a plurality of segments according to an embodiment of the disclosure.
Figure 8B:
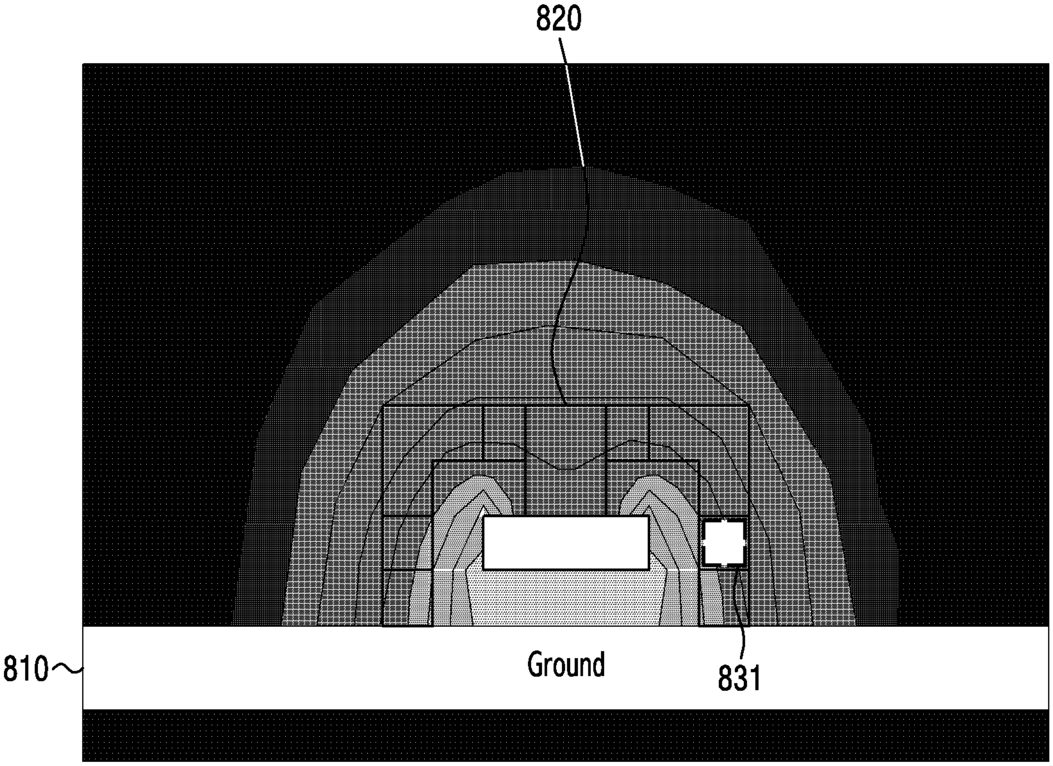
FIG. 8B illustrates an electric field distribution of the transmission line structure including a support including a plurality of segments according to an embodiment of the disclosure.
Figure 8C:
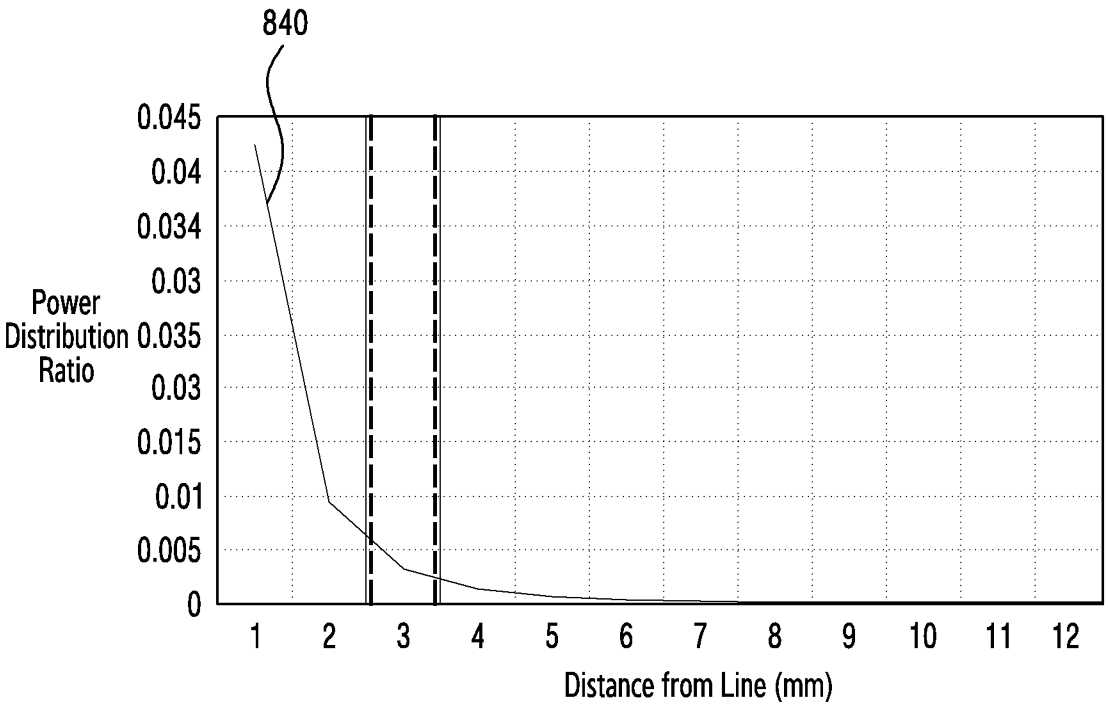
FIG. 8C is a graph illustrating a power distribution ratio according to a distance from a signal line according to an embodiment of the disclosure.

FIG. 8A illustrates a configuration of a transmission line including a support including a plurality of segments according to an embodiment of the disclosure. FIG. 8B illustrates an electric field distribution of the transmission line structure including a support including a plurality of segments according to an embodiment of the disclosure. FIG. 8C is a graph illustrating a power distribution ratio according to a distance from a signal line according to an embodiment of the disclosure. For convenience of description, FIG. 8A illustrates a support in which the plurality of segments are 19 segments. However, the disclosure is not limited thereto. For example, in the case of a support subdivided into more than 19 segments, the power distribution ratio may be measured more accurately than that in the case in which the support is subdivided into less than 19 segments so that an insertion loss by the support can be accurately calculated.

Referring to FIG. 8A, it illustrates a transmission line 800 including a ground area 810, a signal line 820, and a support 830 including a plurality of segments. According to an embodiment, a first segment 831 may be one of the plurality of segments of the support 830. For example, the first segment 831 may be a segment disposed at the same height as the signal line 820. For example, an interval from the signal line 820 to the first segment 831 may be about 2 mm. In addition, the width and height of the first segment 831 may be about 1 mm. In addition, although the term, "the first segment", is exemplarily used, and the position of the first segment is not limited by the term.

FIG. 8B illustrates an electric field generated by the signal line 820 of the transmission line 800 (FIG. 8A) and a first segment 831 of the transmission line 800 of FIG. 8A, and FIG. 8C illustrates a power distribution ratio of the first segment 831 according to a distance from the signal line 820 to the first segment 831.

Referring to FIG. 8B, the intensity of the generated electric field is high at the lower end portion of the signal line 820, and as the distance from the signal line 820 is increased, the intensity of the generated electric field may be lowered. In addition, the intensity of the generated electric field may also be high at the side portions of the signal line 820, and the intensity of the generated electric may be lowered as the distance from the signal line 820 is increased.

Referring to FIG. 8C, the horizontal axis of the graph represents a distance (unit: mm) from the signal line 820, and the vertical axis indicates a power distribution ratio. In the graph, a seventh line 840 represents a power distribution ratio generated in the first segment 831 according to a distance from the signal line 820. According to an embodiment, the seventh line 840 may be understood to be the same as the third line 445 indicating a power distribution ratio for the fourth area 434 or the sixth area 436 of FIG. 4B.

Referring to the seventh line 840, when the distance from the signal line 820 (FIGS. 8A and 8B) corresponds to about 2 mm, a power distribution ratio of about 0.007 may be generated. In addition, when the distance from the signal line 820 (FIGS. 8A and 8B) corresponds to about 3 mm, a power distribution ratio of about 0.002 may be generated. Accordingly, the power distribution ratio generated in the entire area of the first segment 831 (FIGS. 8A and 8B) may be about 0.0033 as an average value of the power distribution ratio at about 2 mm and the power distribution ratio at about 3 mm.

According to an embodiment, a power distribution ratio for a plurality of segments other than the first segment 831 (FIGS. 8A and 8B) may be described with reference to the lines of FIG. 4B. Accordingly, the power distribution ratio of the support 830 (FIG. 8A) may be understood as the sum of the power distribution ratios for the plurality of segments. For example, the power distribution ratio for the entire support 830 described with reference to FIG. 8A may be about 0.0503. As described above, when the support 830 is subdivided into a plurality of segments, the power distribution ratio may be accurately and simply described even when the structure of the support 830 is complicated. That is, even if there is a change in the structure of the support 830 according to use and circumstances, the power distribution ratio of the support 830 may be calculated, and accordingly, the insertion loss by the support 830 may be calculated.

Hereinafter, in consideration of the power distribution ratio by the entire dielectric area and the insertion loss by the signal line described with reference to FIGS. 7A to 7C, and the power distribution ratio by the support described with reference to FIGS. 8A to 8C, the total insertion loss due to transmission of an electrical signal through the transmission line will be described with reference to FIGS. 9 and 10.

In disposing a support formed of a dielectric material in an area overlapping an electric field area generated by the signal line, it is important to accurately calculate a power distribution ratio for an area in which the support is disposed, and to dispose the support at a position having a low power distribution ratio. In addition, as described above, since the generated electric field is high at the lower end portion of the signal line, the insertion loss may be reduced by forming an air layer having a low permittivity and dielectric loss, and a transmission line may be formed at a low cost. Thus, it is important to space the signal line and the ground area apart from each other via the support. In other words, it may be important to dispose the support formed of a dielectric material avoiding an area in which the electric field area is high, and to form an air layer in the lower end portion of the signal line by spacing the signal line and the ground area apart from each other via the support.

Figure 9:
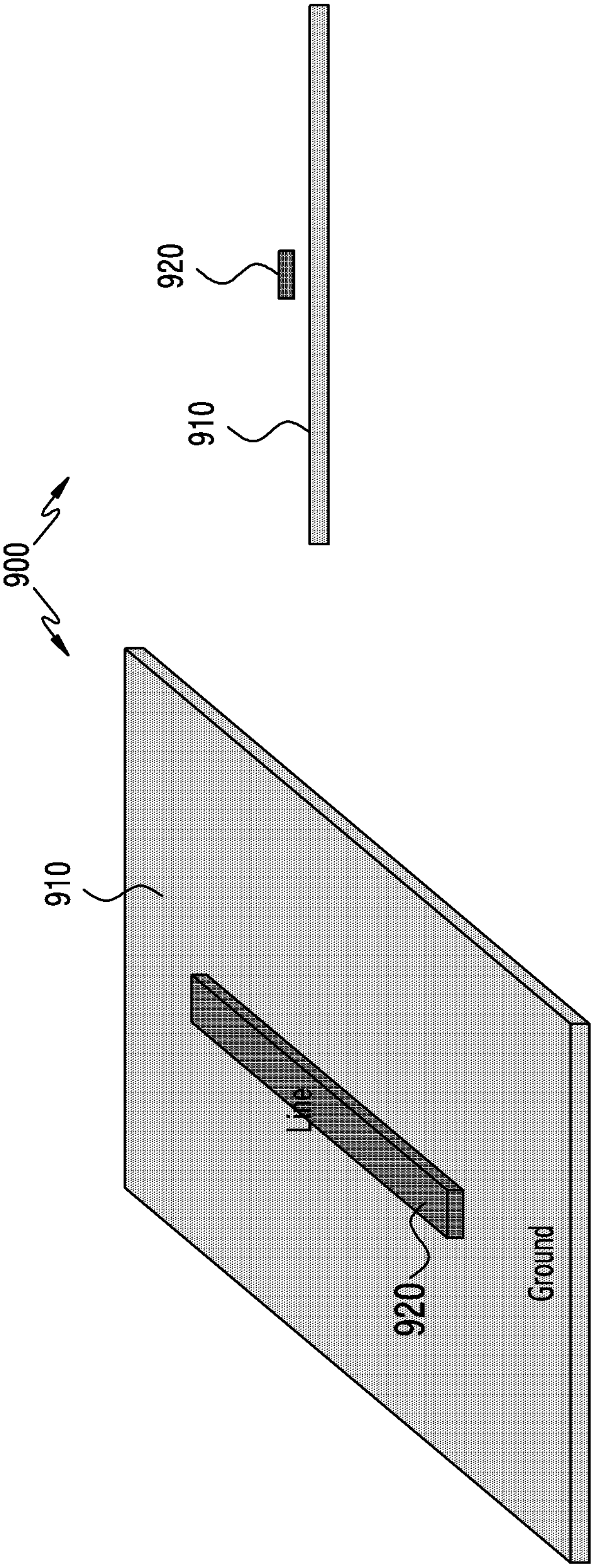
FIG. 9 illustrates a transmission line structure including a signal line and a ground area according to an embodiment of the disclosure.

FIG. 9 illustrates a transmission line structure including a signal line and a ground area according to an embodiment of the disclosure. FIG. 10 is a perspective view of a transmission line structure according to an embodiment of the disclosure.

For convenience of description, FIG. 9 illustrates a transmission line 900 including a signal line 920 having a “_ _” shape having a thickness, and it is assumed that the remaining area of the transmission line 900, except for the signal line 920 and the ground area 910, is formed of air. However, the disclosure is not limited thereto, and the transmission line 900 may be a transmission line 900 including a signal line 920 having other shapes, and the medium may be formed of a dielectric material, other than air.

Referring to FIG. 9, the insertion loss caused by the signal line 920 may be understood as the same as the insertion loss of FIG. 7C as described with reference to FIG. 7C. Therefore, according to an embodiment, the insertion loss by the signal line 920 may be a value of about 0.0585 dB.

Figure 10:
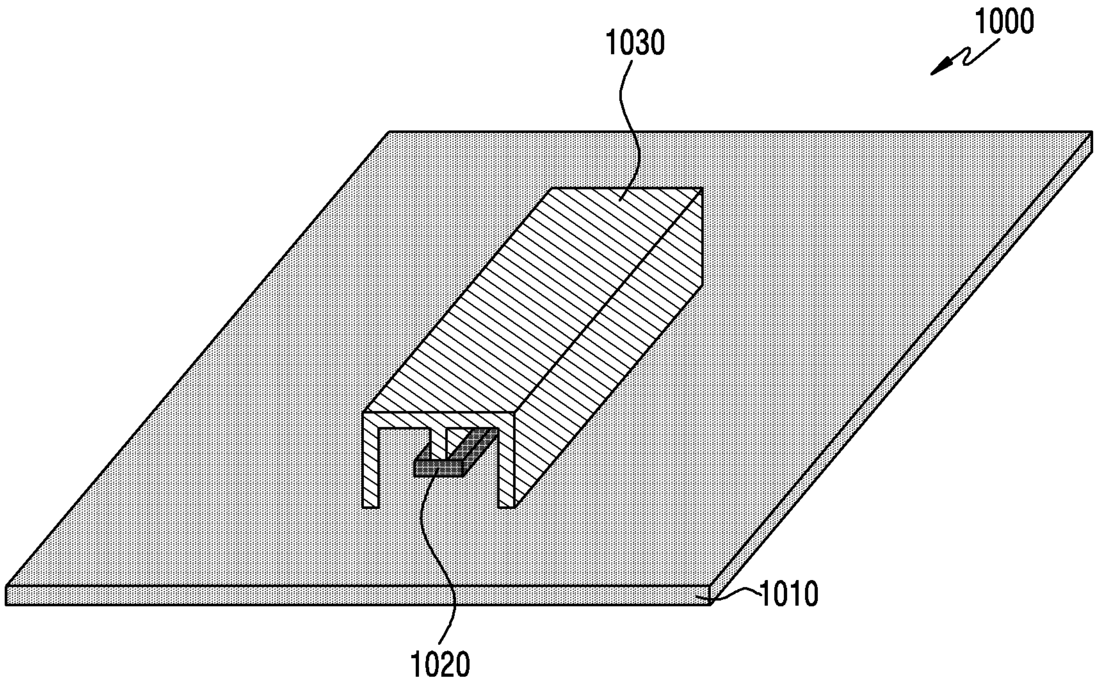
FIG. 10 is a perspective view of a transmission line structure according to an embodiment of the disclosure.

Referring to FIG. 10, the transmission line 1000 may include a ground area 1010, a signal line 1020, and a support 1030. According to an embodiment, the total insertion loss generated when an electrical signal is transmitted in the signal line 1020 of the transmission line 1000 may include an insertion loss caused by the signal line 1020 and an insertion loss caused by the support 1030.

To summarize the above, when considering FIG. 7C, in the transmission line structure in which the remaining area, except for the signal line and the ground area, are formed of a dielectric material (when the loss tangent (tan δ) value is 0.02), the transmitted power of the dielectric area relative to 1 W (input) may be about 0.117 W. In addition, when considering FIG. 8C, the power distribution ratio of the entire support may have a value of about 0.0503. When the above-described about 0.117 W is multiplied by about 0.0503, the transmitted power by the support relative to 1 W (input) may be determined and may correspond to 0.0058851 W. In addition, when the 0.0058851 W is changed to a dB value and added to the insertion loss value due to the signal line described with reference to FIG. 9, the insertion loss of the output relative to the input (1 W) may be determined. For example, in the transmission line 1000 of FIG. 10, the insertion loss caused by the signal line 1020 may be about 0.841 dB, which is the sum of a value of about 0.0256 dB, which is an insertion loss determined by the transmitted power by the support, and a value of about 0.0585 dB, which is an insertion loss. Generally, in the case of a transmission line in which an area, except for a signal line and a ground area, is formed of a dielectric material, it is possible to derive a loss value for output power relative power input to the transmission line when a value obtained by multiplying a power distribution lost by the dielectric material by a power distribution ratio of the support alone is subtracted from the input power, then a value obtained thereby is converted into an insertion loss value, and then an insertion loss due to a signal line is added to the converted insertion loss value.

When a simulation result is compared with the insertion loss determined by the above-described processes, the insertion loss obtained through the simulation for the transmission line 1000 of FIG. 10 corresponds to about 0.0856 dB. Thus, the error between the insertion loss determined by the above-described processes and the insertion loss according to the simulation result may be about 1.8%. Therefore, the method of calculating the insertion loss described with reference to FIGS. 7A to 7C, 8A to 8C, 9, and 10 may enable high accuracy to be obtained. Accordingly, when the insertion loss is calculated in the same way for a transmission line having the structure of a support according to another embodiment, it is possible to obtain a result consistent with the actual results. That is, even when an electrical signal is transmitted by a signal line disposed in a transmission line structure including a support structure having various shapes, it is possible to determine an accurate insertion loss value.

It may mean that the above-described determination processes may be applicable not only to designing a support structure disposed in a specific area in a transmission line, but also to producing a transmission line including a support structure based on the above-described calculation processes. That is, not only a device including the structure of the transmission line of the disclosure, but also the process of manufacturing a transmission line may be understood as an embodiment of the disclosure.

Hereinafter, various embodiments of a transmission line including a structure according to an embodiment of the disclosure will be described with reference to FIGS. 11A to 11E, 12A to 12C, 13A to 13C, and 14A to 14C.

FIGS. 11A to 11E illustrate examples of transmission line structures according to various embodiments of the disclosure. Referring to FIGS. 11A to 11E, for convenience of description, a transmission line including a “—” shaped signal line having a thickness is disclosed, and it is assumed that the remaining area of the transmission line, except for the signal line and the ground area, is formed of air. However, the disclosure is not limited thereto, and the transmission line may include a signal line having other shapes, and the medium may be formed of a dielectric material, other than air.

Figure 11A:
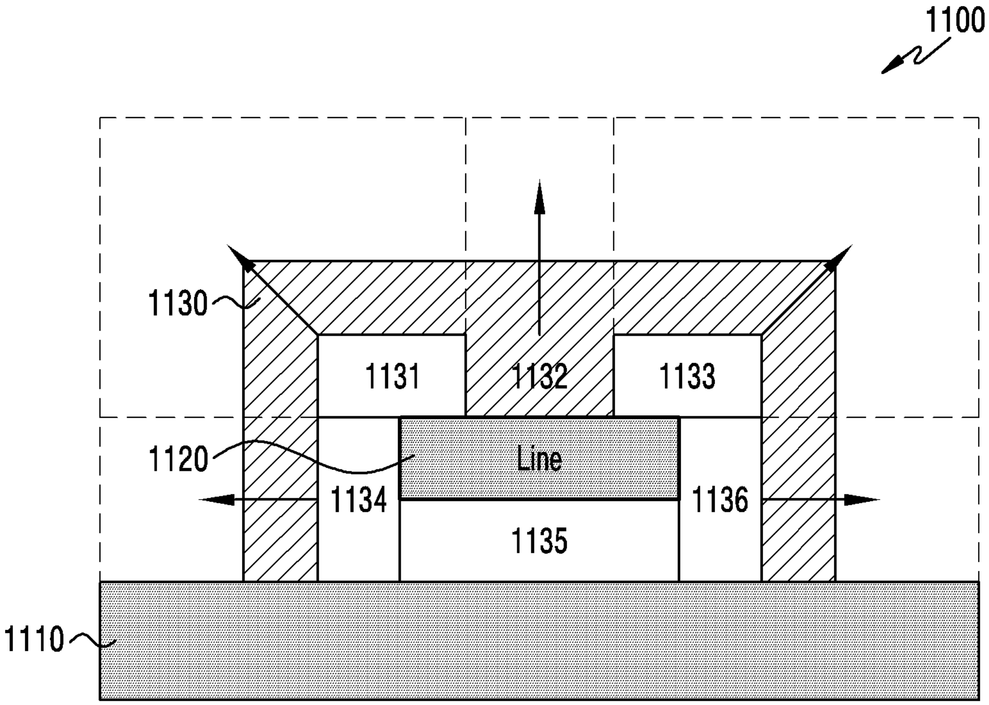
FIGS. 11A, 11B, 11C, 11D, and 11E illustrate examples of transmission line structures according to various embodiments of the disclosure.

Referring to FIG. 11A, a transmission line 1100 may include a ground area 1110, a signal line 1120, and a support 1130. According to an embodiment, the support 1130 may be vertically coupled to the ground area 1110 on the left and right sides with reference to the signal line 1120. In addition, the support 1130 may be coupled to the signal line 1120 in a second area 1132 and an air layer or air gap 1135 may be formed between the signal line 1120 and the ground area 1110. However, the disclosure is not limited thereto, and the support 1130 may be coupled to the ground area 1110 in three or more areas of the signal line 1120, and the support 1130 may be coupled to the signal line 1120 in an area other than the second area 1132 (e.g., the first area 1131).

Figure 11B:
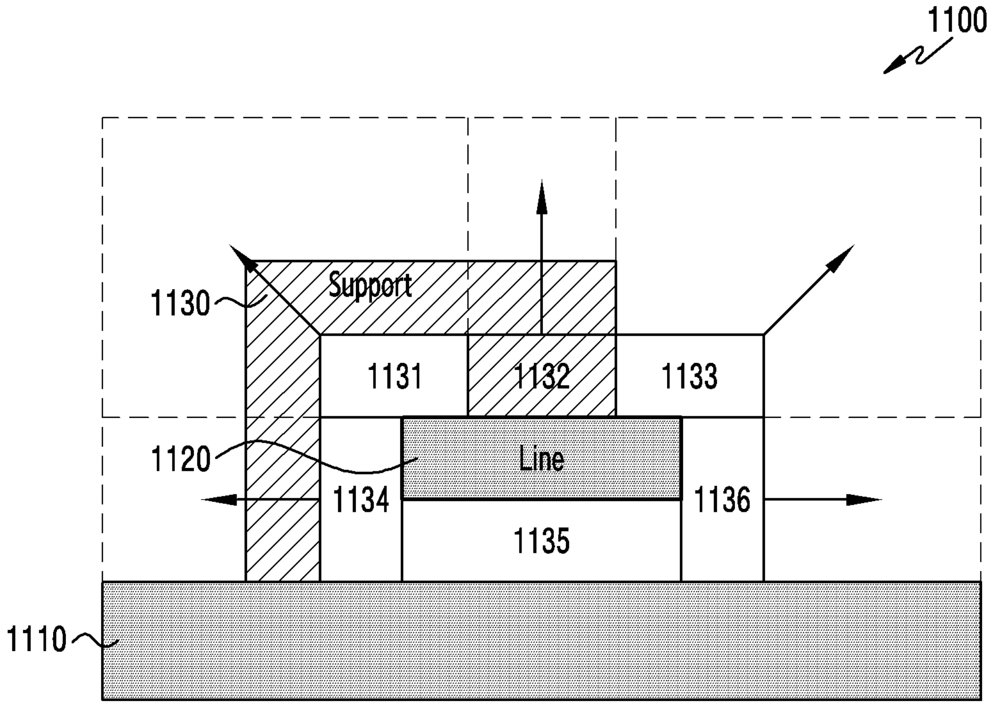

Referring to FIG. 11B, a transmission line 1100 may include a ground area 1110, a signal line 1120, and a support 1130. According to an embodiment, the support 1130 may be coupled to the ground area 1110 on the left side with reference to the signal line 1120. In addition, the support 1130 may be coupled to the signal line 1120 in a second area 1132. However, the disclosure is not limited thereto, and the support 1130 may be coupled to the ground area 1110 on the right side of the signal line 1120, and the support 1130 may be coupled to the signal line 1120 in an area other than the second area 1132 (e.g., the third area 1133).

Figure 11C:
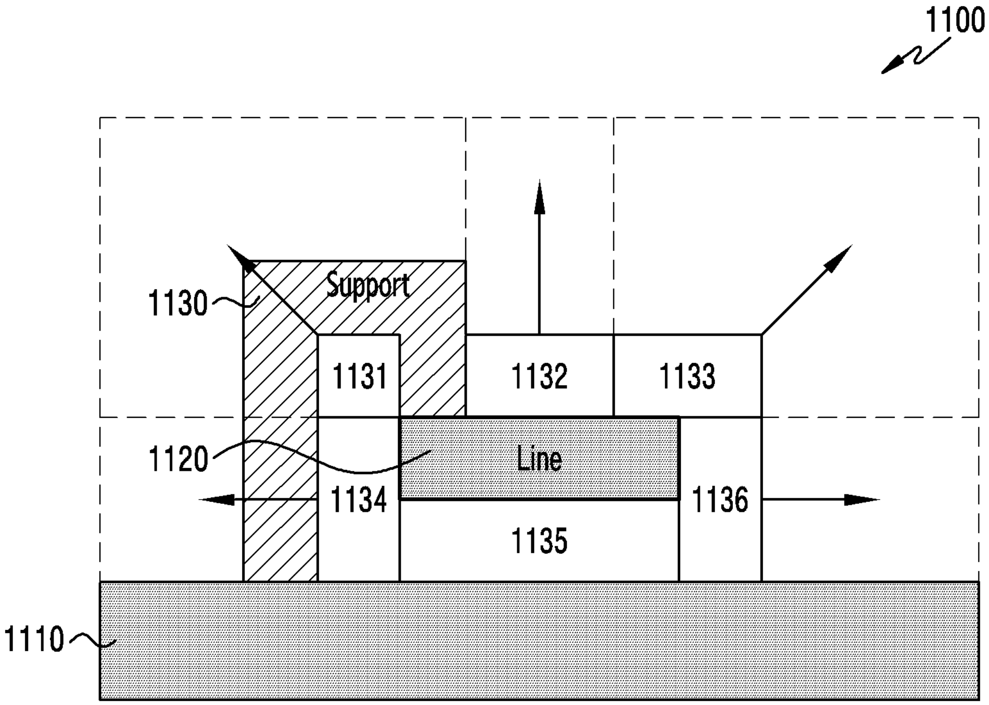

Referring to FIG. 11C, a transmission line 1100 may include a ground area 1110, a signal line 1120, and a support 1130. According to an embodiment, the support 1130 may be coupled to the ground area 1110 on the left side with reference to the signal line 1120. In addition, the support 1130 may be coupled to the signal line 1120 in a first area 1131. However, the disclosure is not limited thereto, and the support 1130 may be coupled to the ground area 1110 on the right side of the signal line 1120, and the support 1130 may be coupled to the signal line 1120 in an area other than the second area 1132 (e.g., the third area 1133).

Figure 11D:
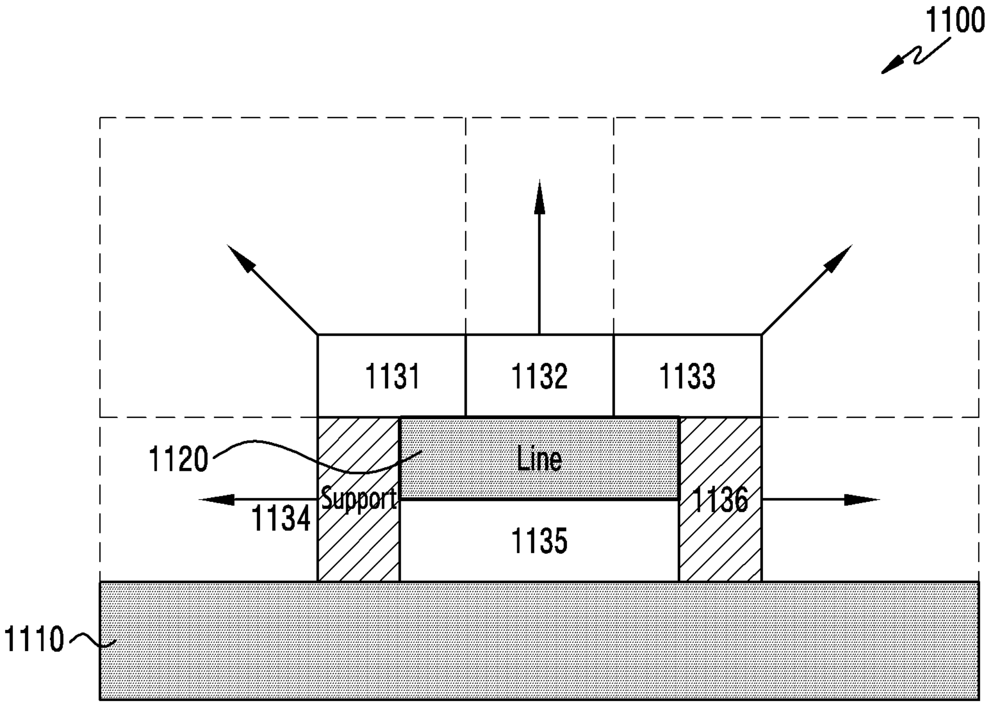

Referring to FIG. 11D, a transmission line 1100 may include a ground area 1110, a signal line 1120, and a support 1130. According to an embodiment, the support 1130 may be coupled to the ground area 1110 on the left and right sides with reference to the signal line 1120. In addition, the support 1130 may be coupled to the signal line 1120 in a fourth area 1134 and a sixth area 1136.

Figure 11E:
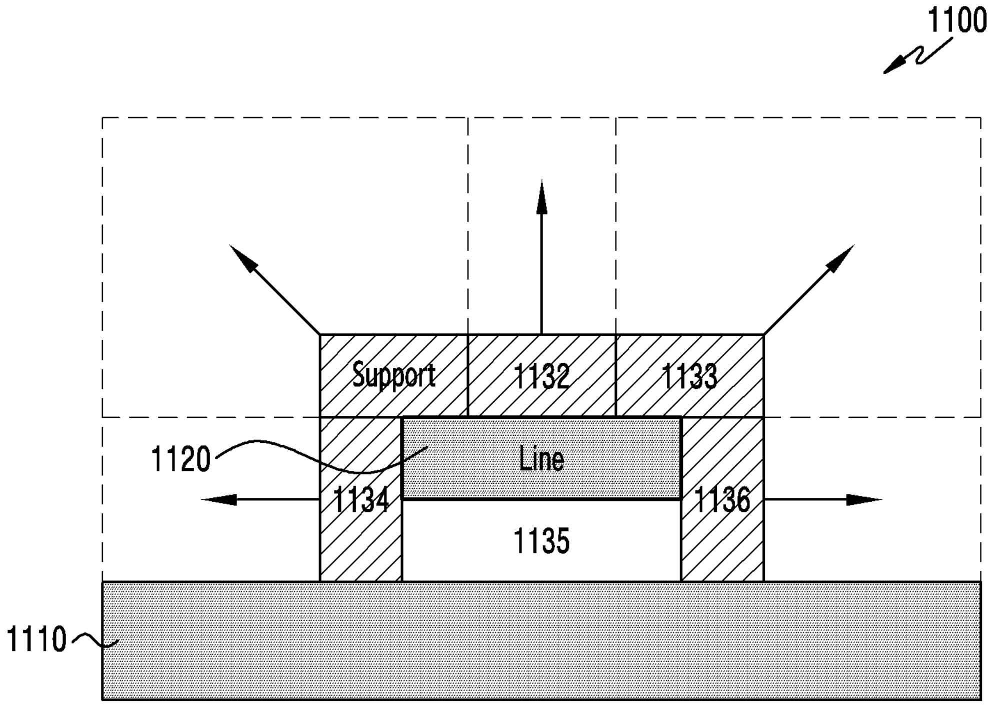

Referring to FIG. 11E, a transmission line 1100 may include a ground area 1110, a signal line 1120, and a support 1130 (FIGS. 11A and 11B). According to an embodiment, the support 1130 may be coupled to the ground area 1110 in the fourth area 1134 and the sixth area 1136 with reference to the signal line 1120. In addition, the support 1130 may be coupled to the signal line 1120 in the first to third areas 1131, 1132, and 1133 without being spaced apart from the signal line 1120.

However, the disclosure is not limited to the above-described various embodiments, and may include a transmission line 1100 in which the signal line 1120 coupled via the support 1130 is disposed while being spaced apart from the ground area 1110, and an air layer (air gap) 1135 is formed between the signal line 1120 and the ground area 1110.

Figure 12A:
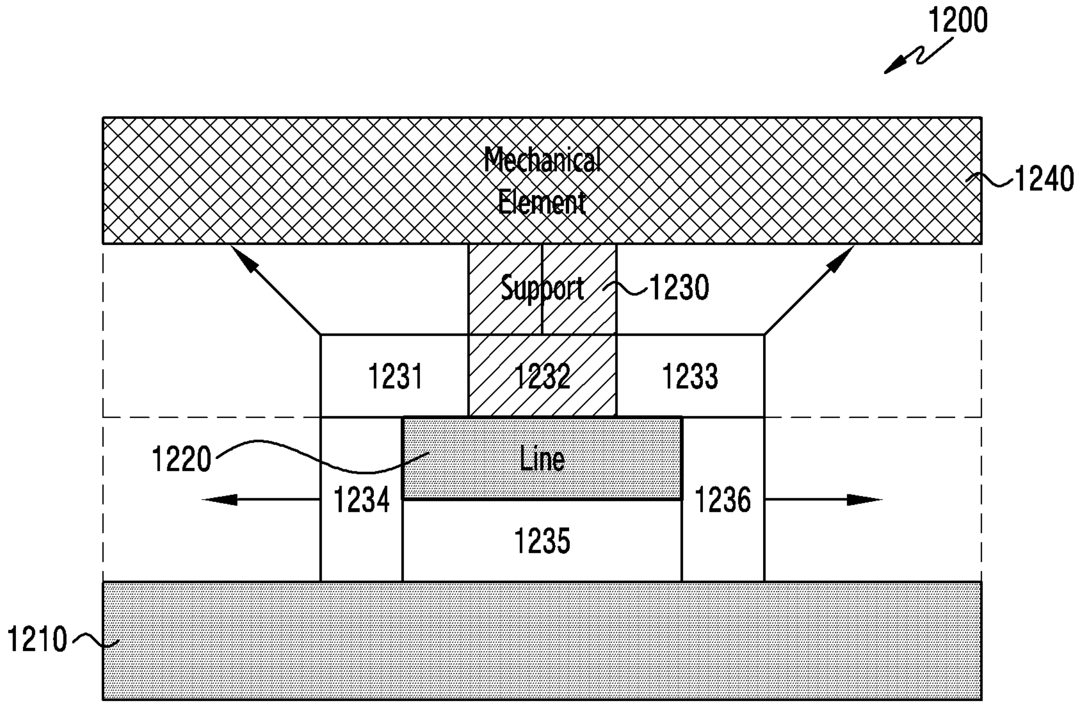
FIGS. 12A, 12B, and 12C illustrate examples of transmission line structures each further including a mechanical element according to various embodiments of the disclosure.
Figure 12B:
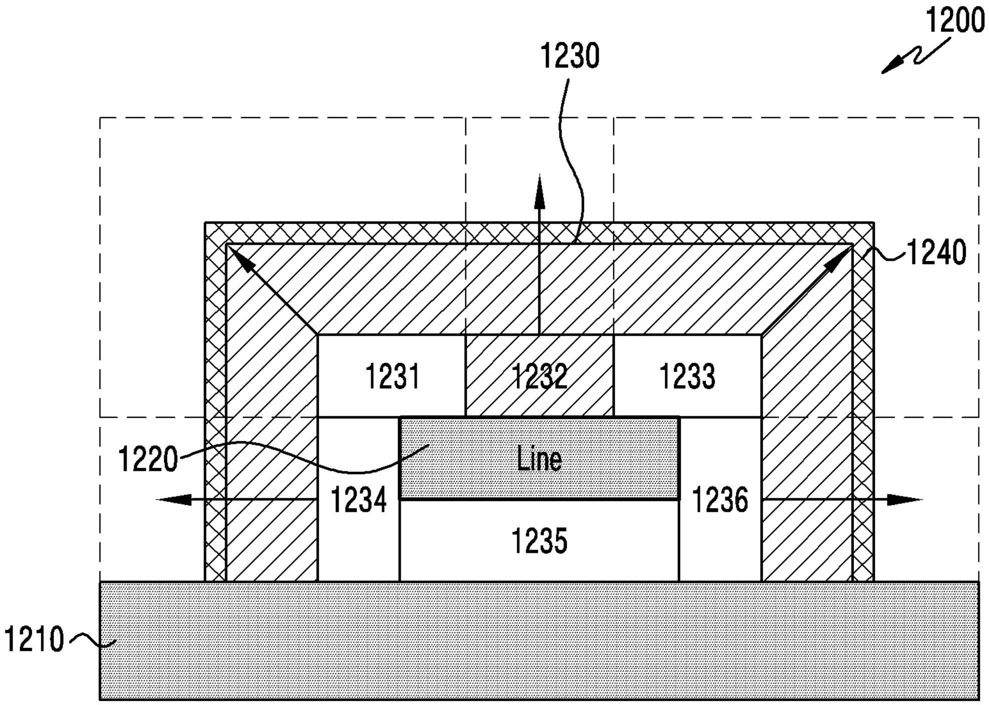
Figure 12C:
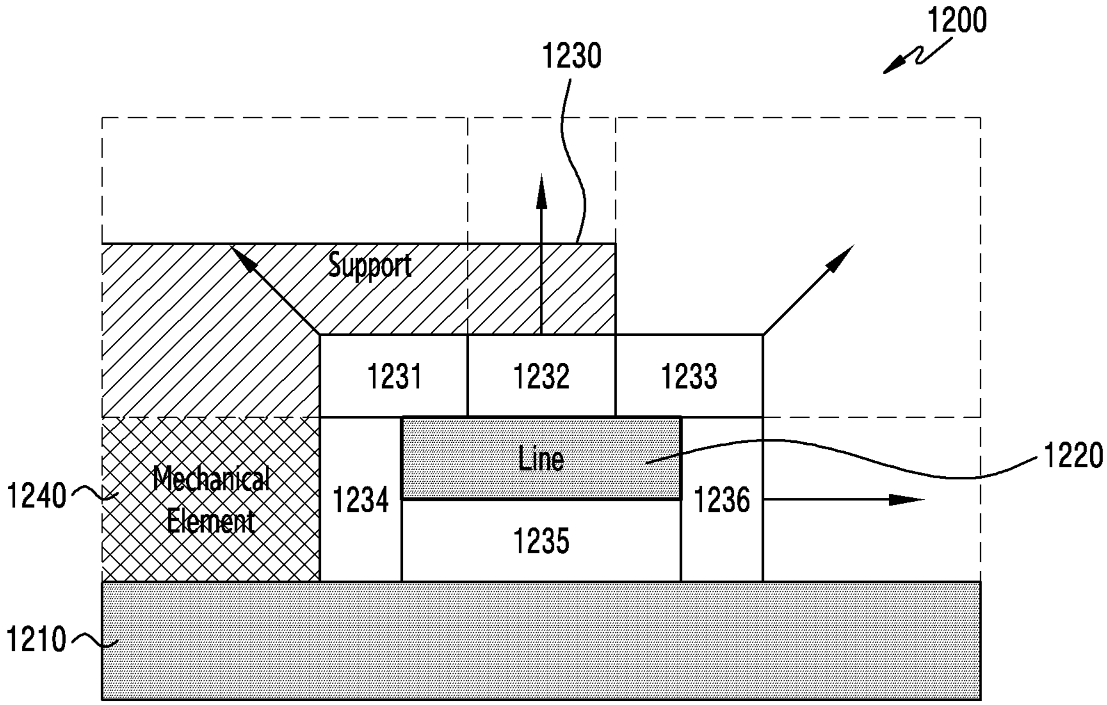

FIGS. 12A to 12C illustrate examples of transmission line structures each further including a mechanical element in a transmission line structure according to various embodiments of the disclosure. Referring to FIGS. 12A to 12C, for convenience of description, a transmission line structure including a "ㅡ" shaped signal line having a thickness is disclosed, and it is assumed that the remaining area of the transmission line, except for the signal line and the ground area, is formed of air. However, the disclosure is not limited thereto, and the transmission line may include a signal line having other shapes, and the medium may be formed of a dielectric material, other than air.

Referring to FIGS. 12A to 12C, a transmission line 1200 may include a ground area 1210, a signal line 1220, and a support 1230, and may further include a mechanical element 1240. According to an embodiment, the mechanical element 1240 may be formed of a material such as a dielectric material or a metal. According to another embodiment, the support 1230 may include a mechanical element 1240, or may be partially formed by the mechanical element 1240 as illustrated in FIGS. 12A and 12C.

Referring to FIG. 12A, a transmission line 1200 may include a ground area 1210, a signal line 1220, a support 1230, and a mechanical element 1240. According to an embodiment, the mechanical element 1240 may be disposed to be spaced apart from the signal line 1220 and the ground area 1210. In addition, the support 1230 may be coupled to the mechanical element 1240 and the signal line 1220 between the mechanical element 1240 and the signal line 1220. For example, the support 1230 may be coupled to the signal line 1220 in a second area 1232. Accordingly, the signal line 1220 may be disposed to be spaced apart from the ground area 1210, and an air layer (air gap) 1235 may be formed. However, the disclosure is not limited thereto, and the support 1230 may be coupled to the signal line 1220 in an area other than the second area 1232 (e.g., the first area 1231, the third area 1233, the fourth area 1234, the sixth area 1236, or the like).

Referring to FIG. 12B, a transmission line 1200 may include a ground area 1210, a signal line 1220, a support 1230, and a mechanical element 1240. According to an embodiment, the mechanical element 1240 may be disposed along the exterior of the support 1230. For example, the mechanical element 1240 may be disposed along the entire exterior of the support 1230. As another example, the mechanical element 1240 may be disposed along a portion of the exterior of the support 1230.

Referring to FIG. 12C, a transmission line 1200 may include a ground area 1210, a signal line 1220, and a support 1230. According to an embodiment, the support 1230 may include a mechanical element 1240. For example, a portion in which the support 1230 and the ground area 1210 are coupled to each other may be provided by the mechanical element 1240. However, the disclosure is not limited thereto, and the mechanical element 1240 may be disposed in a portion spaced apart from the ground area 1210, rather than in the portion in which the support 1230 is coupled to the ground area 1210.

FIGS. 13A to 13C illustrate examples of various structures of signal lines in transmission line structures according to various embodiments of the disclosure. For convenience of description, FIGS. 13A to 13C illustrates by way of an example, a transmission line structure in which the support is coupled to the ground area on the left and right sides with reference to the signal line, the support is coupled to the signal line at the upper end portion of the signal line and includes a ground area formed of one metal layer. However, the disclosure is not limited thereto, and may be applicable to a transmission line including a support having various structures as illustrated in FIGS. 11A to 11E, and 12A to 12C or a transmission line structure further including an additional mechanical element.

Referring to FIG. 13A, a transmission line 1300 may include a ground area 1310, a signal line 1320, and a support 1330. According to an embodiment, the signal line 1320 may have a thin "ㅡ" shape. However, the disclosure is not limited thereto, and may mean that the thickness of the signal line 1320 can be adjusted.

Referring to FIG. 13B, a transmission line 1300 may include a ground area 1310, a signal line 1320, and a support 1330. According to an embodiment, the signal line 1320 may have a shape obtained by rotating a "ㄷ" shape by 90° clockwise. However, the disclosure is not limited thereto, and may mean that the structure of the signal line 1320 can be variously configured.

Referring to FIG. 13C, a transmission line 1300 may include a ground area 1310, a signal line 1320, and a support 1330. According to an embodiment, the signal line 1320 may have a thin "ㅁ" shape. However, the disclosure is not limited thereto, and may mean that the structure of the signal line 1320 can be variously configured.

Figure 14A:
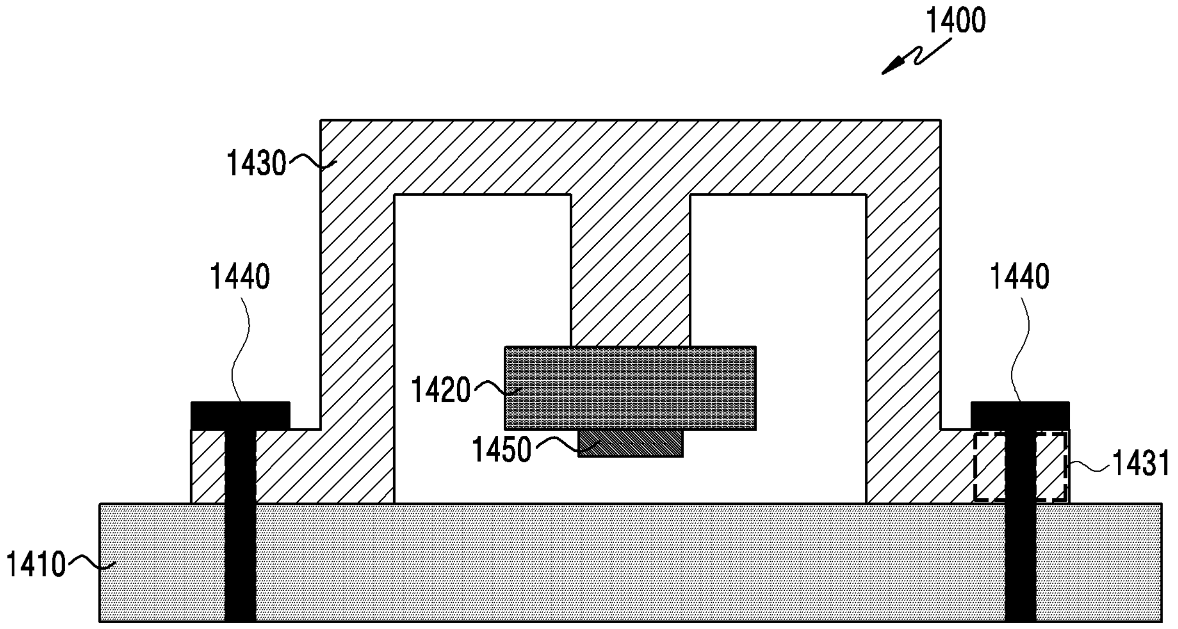
FIGS. 14A, 14B, and 14C illustrate examples of transmission line structures each including a coupling hole and/or a fixing member according to various embodiments of the disclosure.
Figure 14B:
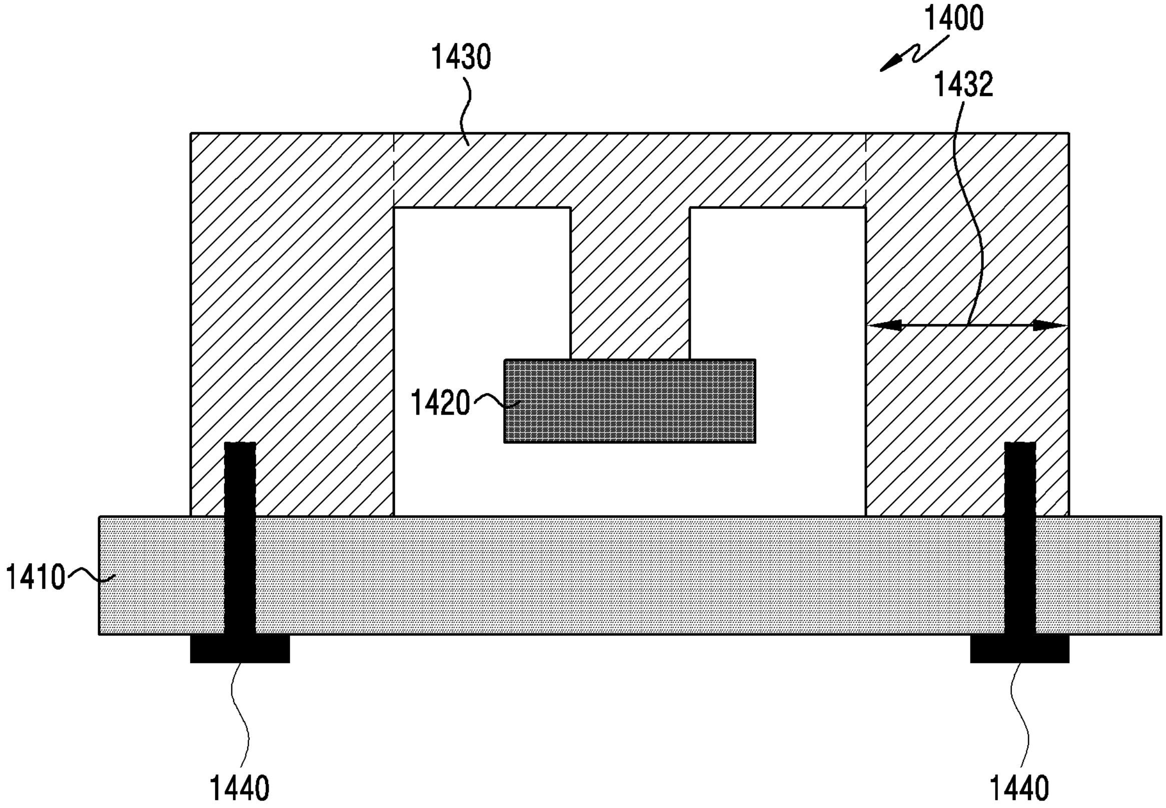
Figure 14C:
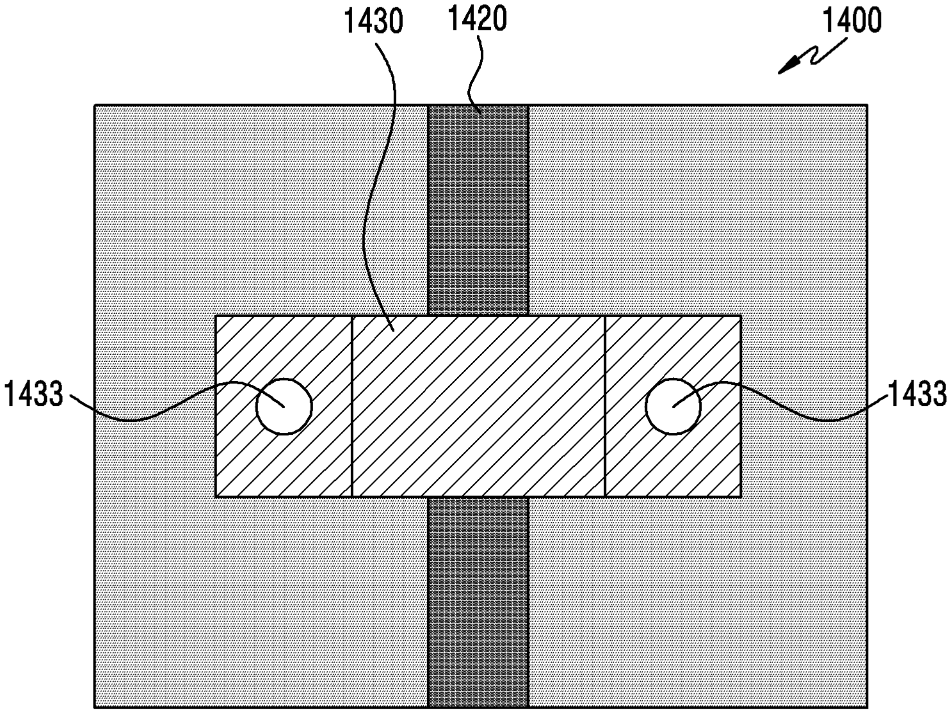

FIGS. 14A to 14C illustrate examples of transmission line structures each including a coupling hole and/or a fixing member according to various embodiments of the disclosure. Referring to FIGS. 14A to 14C, for convenience of description, a transmission line structure including a "—" shaped signal line having a thickness is disclosed, and it is assumed that the remaining area of the transmission line, except for the signal line and the ground area, is formed of air. However, the disclosure is not limited thereto, and the transmission line may include a signal line having other shapes, and the medium may be formed of a dielectric material, other than air.

Referring to FIG. 14A, the transmission line 1400 may include a ground area 1410, a signal line 1420, a support 1430, a first fixing member 1440, and a second fixing member 1450. According to an embodiment, the support 1430 may include a portion 1431 coupled to the ground area 1410 and extending along the ground area 1410, and the first fixing member 1440 may be coupled to the support 1430 in the portion 1431 extended along the ground area 1410. In addition, the first fixing member 1440 may be coupled to both the support 1430 and the ground area 1410. Accordingly, the portion 1431 of the support 1430 and the ground area 1410 may each include a coupling hole (not illustrated). According to an embodiment, the second fixing member 1450 may be disposed on the lower end portion of the signal line 1420. For example, the signal line 1420 may be coupled to the support 1430 by the second fixing member 1450. Accordingly, the signal line 1420 and the support 1430 may each include a coupling hole.

According to an embodiment, the first fixing member 1440 may be configured in various structures. For example, as illustrated in FIG. 14A, the first fixing member 1440 may have a screw shape. As another example, the first fixing member 1440 may include a bolt and a nut, thus including a plurality of parts. According to another embodiment, the first fixing member 1440 may be formed of various materials. For example, the first fixing member 1440 may be formed of metal. As another example, the first fixing member 1440 may be formed of a dielectric material.

According to an embodiment, the second fixing member 1450 may be formed of a dielectric material. The second fixing member 1450 is coupled to the lower end portion of the signal line 1420, and may be configured in structure to minimize attenuation of the intensity of an electric field generated by the signal line 1420, and may be disposed at a portion to minimize the attenuation of the intensity of the electric field.

Referring to FIG. 14B, a transmission line 1400 may include a ground area 1410, a signal line 1420, a support 1430, and a first fixing member 1440. According to an embodiment, the support 1430 may have a wide portion 1432 coupled to the ground area 1410. Accordingly, the first fixing member 1440 may be coupled to both the support 1430 and the ground area 1410 at the lower end portion of the portion 1432 coupled to the ground area 1410 of the support 1430. Accordingly, the portion 1432 of the support 1430 coupled to the ground area may each include a coupling hole (not illustrated). In the support 1430, the portion 1432 coupled to the ground area 1410 may have a large width, but the disclosure is not limited thereto, which may mean that the width of the support 1430 may be changed.

Referring to FIG. 14C, a transmission line 1400 may include a ground area 1410 (FIGS. 14A and 14B), a signal line 1420, and a support 1430. According to an embodiment, the support 1430 may include one or more coupling holes 1433. For example, the coupling holes 1433 may be provided on the left and right sides with reference to the signal line 1420. However, the disclosure is not limited thereto, and according to the shape of the support 1430, one coupling hole 1433 may be formed, or a plurality of coupling holes 1433 may be provided on the left side or the right side. That is, it may mean that the support 1430 may be provided with a coupling hole 1433 to be easily coupled to the ground area 1410 depending on the structure of the support 1430. In addition, a fixing member (e.g., a screw or the like) may be connected to the coupling hole 1433 to couple the support 1430 and the ground area 1410 to each other.

Referring to FIGS. 1A, 1B, 2A to 2C, 3, 4A, 4B, 5A to 5C, 6A to 6C, 7A to 7C, 8A to 8C, 9, 10, 11A to 11E, 12A to 12C, 13A to 13C, and 14A to 14C, a transmission line structure according to an embodiment of the disclosure is more practical compared to using the existing transmission line or a micro-strip including a medium formed of a dielectric material (e.g., FR4, low loss FR4, TEFLON™, or the like) and a metal layer as a ground area. For example, in a transmission line structure according to an embodiment of the disclosure, a medium may be formed of air having a lower permittivity and dielectric loss (loss tangent (tan δ)) than a dielectric material used as a medium in a related art microstrip. Accordingly, the attenuation of an electric field generated by the transmission line may be low, and an insertion loss may be reduced. As another example, a microstrip using a dielectric material (e.g., TEFLON™) having a low permittivity and a dielectric loss has a problem in that the production cost is high. In contrast, in the transmission line structure according to an embodiment of the disclosure, a support formed of a dielectric material (e.g., FR4) having a low production cost is disposed in a place that minimizes an area overlapping an electric field generated by the transmission line, and the signal line and the ground area is coupled to form an air layer between by the support. Thus, the transmission line structure can be produced at a low production cost, and the insertion loss can also be reduced. As another example, in the case of using a related art microstrip, a separate processing operation and a manufacturing process for locally removing a medium disposed on the lower end portion of the signal line or forming an air layer (air gap) in the ground area in order to increase transmission efficiency may be required. In contrast, in the transmission line structure according to an embodiment of the disclosure, an additional process and coupling may be performed relatively simply compared to a related art microstrip. In addition, when the shape of the support needs to be manufactured differently depending on the shape or use in which the signal lines of the transmission line structure are disposed, by manufacturing a support which is subdivided into a plurality of segments and a power distribution ratio is considered for each segment as disclosed in the disclosure, it is possible to form an air layer between the signal line and the ground area while reducing the insertion loss. That is, it is possible to manufacture and dispose an optimized support that is able to reduce an insertion loss according to the situation and use.

According to an embodiment of the disclosure disclosed above, a transmission line structure of a wireless communication system may include a ground area, a signal line, and a support. A first surface of the signal line is disposed to be spaced apart from the ground area via an air layer therebetween, a second surface of the signal line located opposite to the first surface may be coupled to the support, and the support may be coupled to the ground area.

In an embodiment, the support may be configured by at least one segment.

In an embodiment, the at least one segment may include a first segment coupled to the ground area, a second segment coupled to the second surface of the signal line, and a third segment located between the first segment and the second segment and coupled to the first segment and the second segment, and the first segment and the third segment may be disposed to be spaced apart from the signal line.

In an embodiment, the first segment may include a coupling hole.

In an embodiment, the transmission line structure may further include a first fixing member connected to the coupling hole, and the first segment and the ground area may be coupled to each other by the first fixing member.

In an embodiment, the at least one segment may be coupled to the signal line in a third direction perpendicular to the first direction and the second direction, and the at least one segment may be coupled to the ground area.

In an embodiment, the support may be formed of a dielectric material.

In an embodiment, the coupling may be achieved by bonding or fusion.

In an embodiment, the transmission line structure may further include a second fixing member configured to couple the support and the signal line to each other. The second fixing member may be disposed on the second surface of the signal line.

In an embodiment, the transmission line structure may further include a mechanical element coupled to the at least one segment.

In an embodiment, the mechanical element may be coupled along an exterior of the at least one segment.

In an embodiment, at least a portion of the support may be formed of a metal material.

In an embodiment, the support may be disposed along a power distribution determined by an electric field generated by the signal line.

According to an embodiment of the disclosure described above, an RF circuit of a wireless communication system may include a plurality of radio frequency (RF) components, and a transmission line structure. The transmission line structure may include a ground area, a signal line, and a support formed of a dielectric material, the plurality of RF components may be disposed on the transmission line structure, the plurality of RF components may be connected by the signal line, the first surface of the signal line may be disposed to be spaced apart from the ground area via an air layer therebetween, a second surface of the signal line opposite to the first surface may be coupled to the support, and the support may be coupled to the ground area.

In an embodiment, the support may be configured by at least one segment.

In an embodiment, the at least one segment may include a first segment coupled to the ground area, a second segment coupled to the second surface of the signal line, and a third segment located between the first segment and the second segment and coupled to the first segment and the second segment, and the first segment and the third segment may be disposed to be spaced apart from the signal line.

In an embodiment, the first segment may include a coupling hole, the transmission line structure may further include a first fixing member connected to the coupling hole, and the first segment and the ground area may be coupled to each other by the first fixing member.

In an embodiment, the transmission line structure may further include a second fixing member configured to couple the support and the signal line to each other. The second fixing member may be disposed on the second surface of the signal line.

In an embodiment, the transmission line structure may further include a mechanical element coupled to the at least one segment.

In an embodiment, the support may be disposed along a power distribution determined by an electric field generated by the signal line.

Figure 15:
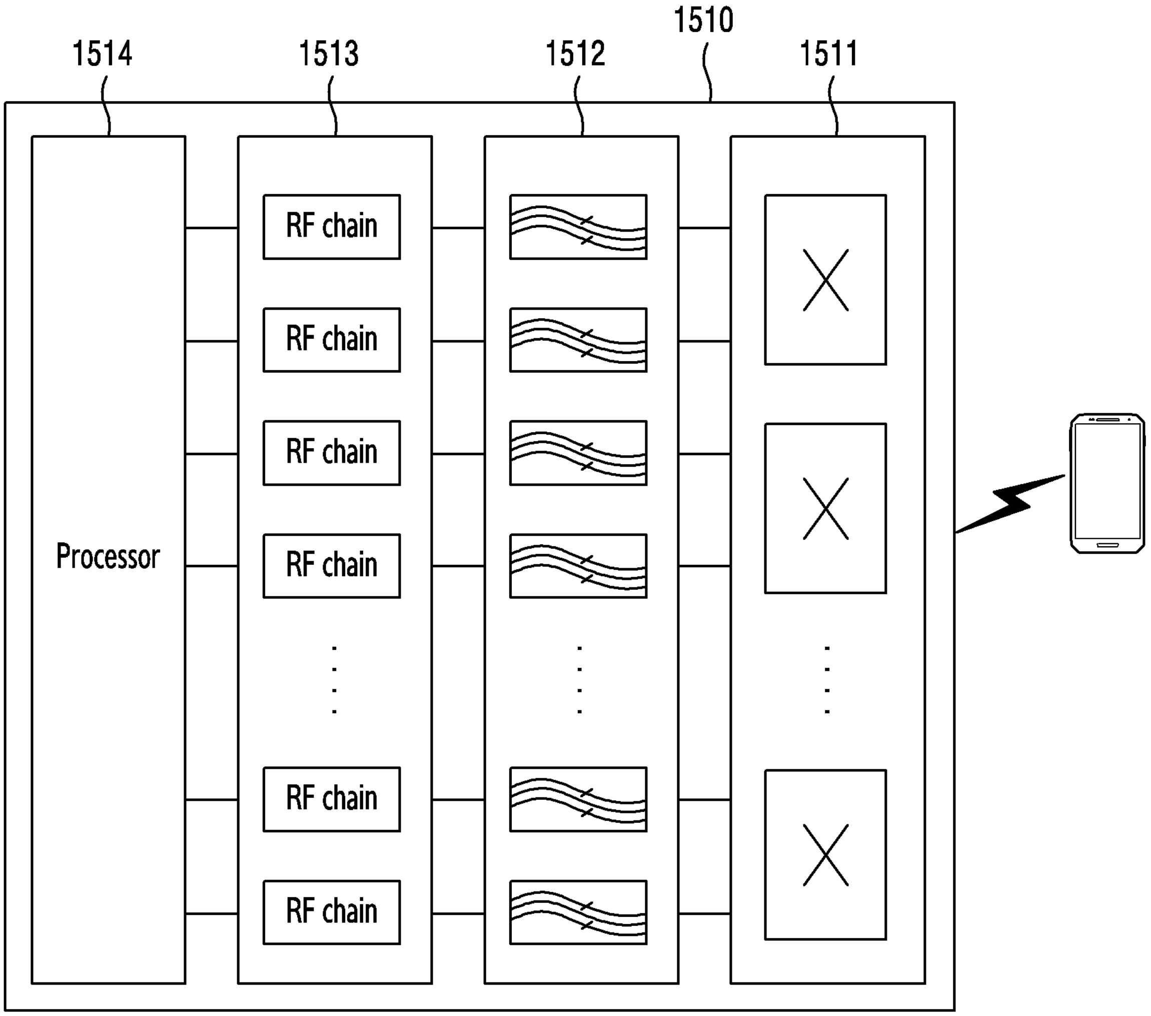
FIG. 15 illustrates a functional configuration of an electronic device according to an embodiment of the disclosure.

FIG. 15 illustrates a functional configuration of an electronic device according to an embodiment of the disclosure. The electronic device 1510 may be one of the base station 110-1 or 110-2 of FIG. 1A or the terminal 120. According to an embodiment, the electronic device 1510 may be an MMU. Not only the structure of the transmission line structure described with reference to FIGS. 1B, 2A to 2C, 3, 4A, 4B, 5A to 5C, 6A to 6C, 7A to 7C, 8A to 8C, 9, 10, 11A to 11E, 12A to 12C, 13A to 13C, and 14A to 14C, but also an electronic device including the same are included in the embodiments of the disclosure.

Referring to FIG. 15, a functional configuration of the electronic device 1510 is illustrated. The electronic device 1510 may include an antenna unit 1511, a filter unit 1512, a radio frequency (RF) processing unit 1513, and a processor or controller 1514.

The antenna unit 1511 may include a plurality of antennas. The antennas perform functions for transmitting/receiving signals through an RF channel. The antennas may each include a conductor formed on a substrate (e.g., a PCB) or a radiator configured as a conductive pattern. The antennas may radiate an up-converted signal on the RF channel or acquire a signal radiated from another device. Each antenna may be referred to as an antenna element or an antenna device. In some embodiments, the antenna unit 1511 may include an antenna array (e.g., a sub array) in which a plurality of antenna elements form an array. The antenna unit 1511 may be electrically connected to the filter unit 1512 via RF signal lines. The antenna unit 1511 may be mounted on a PCB including a plurality of antenna elements. The PCB may include a plurality of RF signal lines connecting respective antenna elements and the filters of the filter unit 1512. These RF signal lines may be referred to as a feeding network. The antenna unit 1511 may provide a received signal to the filter unit 1512 or radiate a signal provided from the filter unit 1512 into air.

The antenna unit 1511 according to various embodiments may include at least one antenna module having a dual polarization antenna. The dual polarization antenna may be, for example, a cross-pole (x-pol) antenna. The dual polarization antenna may include two antenna elements corresponding to different polarizations. For example, the dual polarization antenna may include a first antenna element having a polarization of +45° and a second antenna element having a polarization of −45°. Of course, the polarizations may include other polarizations orthogonal to +45° and −45°. Each antenna element may be connected to a feeding line, and may be electrically connected to the filter unit 1512, the RF processing unit 1513, and the controller 1514, which will be described later.

According to an embodiment, the dual polarization antenna may be a patch antenna (or a microstrip antenna). Since the dual polarization antenna may have the shape of a patch antenna to be easily implemented and integrated into an array antenna. Two signals having different polarized waves may be input to respective antenna ports. Each antenna port corresponds to an antenna element. For high efficiency, it is required to optimize the relationship between a co-polarization (co-pol) characteristic and a cross-pol characteristic between two signals having different polarized waves. In a dual polarization antenna, the co-pol characteristic indicates a characteristic for a specific polarization component and the cross-pole characteristic indicates a characteristic for a polarization component different from the specific polarization component.

The filter unit 1512 may perform filtering to transmit a signal of a desired frequency. The filter unit 1512 may perform a function of selectively discriminating a frequency by forming resonance. In some embodiments, the filter unit 1512 may form a resonance through a cavity structurally including a dielectric material. In addition, in some embodiments, the filter unit 1512 may form resonance through elements that form inductance or capacitance. In some embodiments, the filter unit 1512 may include an elastic filter such as a bulk acoustic wave (BAW) filter or a surface acoustic wave (SAW) filter. The filter unit 1512 may include at least one of a band pass filter, a low pass filter, a high pass filter, or a band reject filter. That is, the filter unit 1512 may include RF circuits for obtaining a signal of a frequency band for transmission or a frequency band for reception. The filter unit 1512 according to various embodiments may electrically connect the antenna unit 1511 and the RF processor 1513 to each other.

The RF processing unit 1513 may include a plurality of RF paths. An RF path may be a unit of a path through which a signal received through an antenna or a signal radiated through an antenna passes. At least one RF path may be referred to as "an RF chain". The RF chain may include a plurality of RF elements. The RF components may each include an amplifier, a mixer, an oscillator, a DAC, an ADCs, or the like. For example, the RF processing unit 1513 may include an up-converter that up-converts a digital transmission signal of a base band to a transmission frequency, and a digital-to-analog converter (DAC) that converts the up-converted digital transmission signal into an analog RF transmission signal. The up-converter and the DAC form a part of the transmission path. The transmission path may further include a power amplifier (PA) or a coupler (or a combiner). In addition, for example, the RF processing unit 1513 may include an analog-to-digital converter (ADC) that converts an analog RF reception signal into a digital reception signal and a down-converter that converts a digital reception signal into a baseband digital reception signal. The ADC and the down-converter form a part of the reception path. The reception path may further include a low-noise amplifier (LNA) or a coupler (or a divider). The RF components of the RF processing unit may be implemented on a PCB. The base station 110-1 or 110-2 in FIG. 1 may include a structure in which the antenna unit 1511, the filter unit 1512, and the RF processing unit 1513 are stacked in this order. The antennas and RF components of the RF processing unit may be implemented on a PCB, and filters may be repeatedly fastened between PCBs to form a plurality of layers.

The controller 1514 may control overall operations of the electronic device 1510. The controller 1514 may include various modules for performing communication. The controller 1514 may include at least one processor such as a modem. The controller 1514 may include modules for digital signal processing. For example, the controller 1514 may include a modem. During data transmission, the controller 1514 generates complex symbols by encoding and modulating a transmitted bit stream. In addition, for example, when data is received, the controller 1514 restores the received bit stream by demodulating and decoding the baseband signal. The controller 1514 may perform functions of a protocol stack required by a communication standard.

FIG. 15 illustrates a functional configuration of an electronic device 1510 as equipment to which the structure of the transmission line of the disclosure may be utilized. However, the example illustrated in FIG. 15 is only a configuration for a transmission line structure according to various embodiments of the disclosure described with reference to FIGS. 1B, 2A to 2C, 3, 4A, 4B, 5A to 5C, 6A to 6C, 7A to 7C, 8A to 8C, 9, 10, 11A to 11E, 12A to 12C, 13A to 13C, and 14A to 14C, and the embodiments of the disclosure are not limited to the components of the equipment illustrated in FIG. 15. Accordingly, an antenna module including a transmission line structure, communication equipment having another configuration, and an antenna structure itself may also be understood as embodiments of the disclosure.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A transmission line structure of a wireless communication system, the transmission line structure comprising:

a ground area;

a signal line; and a support, wherein a first surface of the signal line is disposed to be spaced apart from the ground area through an air layer, wherein a second surface of the signal line located opposite to the first surface is coupled to the support, wherein the support is coupled to the ground area, and wherein the support is coupled to a center part relative to a width of the second surface of the signal line.

2. The transmission line structure of claim 1, wherein the support is configured with at least one segment.

3. The transmission line structure of claim 2, wherein the at least one segment includes a first segment coupled to the ground area, a second segment coupled to the second surface of the signal line, and a third segment located between the first segment and the second segment and coupled to the first segment and the second segment, and wherein the first segment and the third segment are disposed to be spaced apart from the signal line.

4. The transmission line structure of claim 3, wherein the first segment includes a coupling hole.

5. The transmission line structure of claim 4, further comprising:

a first fixing member connected to the coupling hole, wherein the first segment and the ground area are coupled to each other by the first fixing member.

6. The transmission line structure of claim 2, wherein the at least one segment is coupled to the signal line in a third direction perpendicular to a first direction and a second direction, and wherein the at least one segment is coupled to the ground area.

7. The transmission line structure of claim 2, further comprising:

a second fixing member configured to couple the support and the signal line to each other, wherein the second fixing member is disposed on the second surface of the signal line.

8. The transmission line structure of claim 2, further comprising:

a mechanical element coupled to the at least one segment.

9. The transmission line structure of claim 8, wherein the mechanical element is coupled along an exterior of the at least one segment.

10. The transmission line structure of claim 1, wherein the support is formed of a dielectric material.

11. The transmission line structure of claim 1, wherein the support is coupled to the ground area by bonding or fusion.

12. The transmission line structure of claim 1, wherein at least a portion of the support is formed of a metal material.

13. The transmission line structure of claim 1, wherein the support is disposed at a position having a low power distribution ratio for an area that the support is disposed, and wherein a power distribution is determined by an electric field generated by the signal line.

14. A Radio Frequency (RF) circuit of a wireless communication system, the RF circuit comprising:

a plurality of RF components; and a transmission line structure, wherein the transmission line structure includes a ground area, a signal line, and a support formed of a dielectric material, wherein the plurality of RF components are disposed on the transmission line structure and connected by the signal line, wherein a first surface of the signal line is disposed to be spaced apart from the ground area through an air layer, and a second surface of the signal line located opposite to the first surface is coupled to the support, wherein the support is coupled to the ground area, and wherein the support is coupled to a center part relative to a width of the second surface of the signal line.

15. The RF circuit of claim 14, wherein the support is configured with at least one segment.

16. The RF circuit of claim 15, wherein the at least one segment includes a first segment coupled to the ground area, a second segment coupled to the second surface of the signal line, and a third segment located between the first segment and the second segment and coupled to the first segment and the second segment, and wherein the first segment and the third segment are disposed to be spaced apart from the signal line.

17. The RF circuit of claim 16, wherein the first segment includes a coupling hole, wherein the RF circuit further comprises a first fixing member connected to the coupling hole, and wherein the first segment and the ground area are coupled to each other by the first fixing member.

18. The RF circuit of claim 15, further comprising:

a second fixing member configured to couple the support and the signal line to each other, wherein the second fixing member is disposed on the second surface of the signal line.

19. The RF circuit of claim 15, further comprising:

a mechanical element coupled to the at least one segment.

20. The RF circuit of claim 14, wherein the support is disposed at a position having a low power distribution ratio for an area that the support is disposed, and wherein a power distribution is determined by an electric field generated by the signal line.

* * * * *